US012196200B2

(12) United States Patent
Thompson et al.

(10) Patent No.: US 12,196,200 B2
(45) Date of Patent: Jan. 14, 2025

(54) PUMP ROD AND DRIVING LINK WITH SIDE-LOAD REDUCING CONFIGURATION

(71) Applicant: Graco Minnesota Inc., Minneapolis, MN (US)

(72) Inventors: David J. Thompson, Oak Grove, MN (US); Christopher A. Lins, Waverly, MN (US); Andrew J. Kopel, Stanchfield, MN (US); Glen W. Davidson, Roseville, MN (US); Chad R. Taszarek, Albertville, MN (US); Chris W. Sydow, Becker, MN (US); William M. Blenkush, Becker, MN (US); Steve J. Wrobel, Rogers, MN (US)

(73) Assignee: Graco Minnesota Inc., Minneapolis, MN (US)

(*) Notice: Subject to any disclaimer, the term of this patent is extended or adjusted under 35 U.S.C. 154(b) by 0 days.

(21) Appl. No.: 18/440,361

(22) Filed: Feb. 13, 2024

(65) Prior Publication Data

US 2024/0191709 A1 Jun. 13, 2024

Related U.S. Application Data

(63) Continuation of application No. 18/231,617, filed on Aug. 8, 2023, now Pat. No. 11,927,184, which is a (Continued)

(51) Int. Cl.
*F04B 53/14* (2006.01)
*F04B 19/22* (2006.01)
(Continued)

(52) U.S. Cl.
CPC ............ *F04B 53/144* (2013.01); *F04B 19/22* (2013.01); *F04B 53/147* (2013.01); (Continued)

(58) Field of Classification Search
CPC ............................... F04B 53/147; F04B 53/22
See application file for complete search history.

(56) References Cited

U.S. PATENT DOCUMENTS 1,060,351 A 4/1913 Molloy et al.
1,865,350 A 6/1932 William
(Continued)

FOREIGN PATENT DOCUMENTS

CN 87202952 U 3/1988
CN 2262110 Y 9/1997
(Continued)

OTHER PUBLICATIONS

Chinese Office Action Application No. 2015800634940, dated Jul. 30, 2018, 21 pages.
(Continued)

*Primary Examiner* — Michael Leslie
(74) *Attorney, Agent, or Firm* — Kinney & Lange, P. A.

(57) ABSTRACT

A displacement pump is configured to mount to a drive housing. A reciprocating drive is connectable to a pump rod of the displacement pump and includes a connecting rod and a drive link that receives a head of the pump rod. A flange projects from a pump body of the pump and a ring projects from the pump body of the pump. A portion of the drive housing is received in a gap between the flange and the ring.

20 Claims, 16 Drawing Sheets

Related U.S. Application Data continuation of application No. 17/989,250, filed on Nov. 17, 2022, now Pat. No. 11,732,708, which is a continuation of application No. 17/861,864, filed on Jul. 11, 2022, now Pat. No. 11,530,697, which is a continuation of application No. 17/688,360, filed on Mar. 7, 2022, now Pat. No. 11,396,871, which is a continuation of application No. 17/325,684, filed on May 20, 2021, now Pat. No. 11,286,926, which is a continuation of application No. 16/696,255, filed on Nov. 26, 2019, now Pat. No. 11,035,359, which is a continuation of application No. 14/984,212, filed on Dec. 30, 2015, now Pat. No. 10,502,206.

(60) Provisional application No. 62/097,806, filed on Dec. 30, 2014, provisional application No. 62/097,800, filed on Dec. 30, 2014, provisional application No. 62/097,804, filed on Dec. 30, 2014, provisional application No. 62/097,791, filed on Dec. 30, 2014.

(51) Int. Cl.

| | |
|---|---|
| ***F04B 53/16*** | (2006.01) |
| ***F04B 53/22*** | (2006.01) |
| ***F15B 15/14*** | (2006.01) |
| *F04B 15/02* | (2006.01) |

(52) U.S. Cl.

CPC ............ *F04B 53/162* (2013.01); *F04B 53/22* (2013.01); *F15B 15/1438* (2013.01); *F04B 15/02* (2013.01)

(56) References Cited

U.S. PATENT DOCUMENTS

| | | | |
|---|---|---|---|
| 2,286,263 | A | 6/1942 | Comins |
| 2,464,936 | A | 3/1949 | McConaghy |
| 2,737,817 | A | 3/1956 | Harris et al. |
| 2,821,404 | A | 1/1958 | Sloan |
| 2,844,103 | A | 7/1958 | Allen |
| 3,279,376 | A | 10/1966 | Hart |
| 3,414,302 | A | 12/1968 | Priest |
| 3,501,180 | A | 3/1970 | Waara |
| 3,670,630 | A | 6/1972 | Tyson et al. |
| 3,814,086 | A | 6/1974 | Lemb |
| 3,857,642 | A | 12/1974 | Miller |
| 3,967,542 | A | 7/1976 | Hall et al. |
| 4,060,351 | A | 11/1977 | Cloup |
| 4,348,159 | A | 9/1982 | Acheson |
| 4,511,276 | A | 4/1985 | Doutt |
| 4,635,621 | A | 1/1987 | Atkinson |
| 4,637,193 | A | 1/1987 | Lange |
| 4,681,516 | A | 7/1987 | Ohara et al. |
| 4,696,211 | A | 9/1987 | Bitzel |
| 4,749,300 | A | 6/1988 | Berger et al. |
| 5,032,349 | A | 7/1991 | Brandes et al. |
| 5,061,077 | A | 10/1991 | Whiteman |
| 5,122,032 | A | 6/1992 | Shields et al. |
| 5,135,329 | A | 8/1992 | Yuda |
| 5,253,981 | A | 10/1993 | Yang et al. |
| 5,407,292 | A | 4/1995 | Collins |
| 5,413,031 | A | 5/1995 | Kohlmeyer |
| 5,440,282 | A | 8/1995 | Devendorf et al. |
| 5,509,766 | A | 4/1996 | Leuschner |
| 5,525,515 | A | 6/1996 | Blattner |
| 5,533,488 | A | 7/1996 | Cook et al. |
| 5,609,646 | A | 3/1997 | Field et al. |
| 5,711,709 | A | 1/1998 | McCoy |
| D390,923 | S | 2/1998 | Stevens |
| 6,032,349 | A | 3/2000 | Wagner et al. |
| 6,183,225 | B1 | 2/2001 | Thompson |
| 6,212,998 | B1 | 4/2001 | Thompson et al. |
| 6,428,287 | B1 | 8/2002 | Denkins et al. |
| 6,533,488 | B2 | 3/2003 | Blenkush et al. |
| 6,609,646 | B2 | 8/2003 | Miller et al. |
| 6,764,284 | B2 | 7/2004 | Oehman |
| 6,994,500 | B2 | 2/2006 | Ward et al. |
| 7,036,752 | B1 | 5/2006 | Hsiang |
| 7,112,025 | B2 | 9/2006 | Ward et al. |
| 7,448,857 | B1 | 11/2008 | Fugere |
| 7,568,874 | B2 | 8/2009 | Riedel et al. |
| 7,918,654 | B2 | 4/2011 | Adahan |
| 8,167,583 | B2 | 5/2012 | Harnetiaux et al. |
| 8,177,524 | B1 | 5/2012 | Kieffer et al. |
| 8,581,866 | B2 | 11/2013 | Park et al. |
| 8,596,555 | B2 | 12/2013 | Thompson et al. |
| 8,602,751 | B2 | 12/2013 | Courier |
| 9,068,567 | B2 | 6/2015 | Hitter et al. |
| 10,077,771 | B2 | 9/2018 | Davidson et al. |
| 10,094,375 | B2 | 10/2018 | Davidson et al. |
| 10,337,614 | B2 | 7/2019 | Horning et al. |
| 10,502,206 | B2 | 12/2019 | Thompson et al. |
| 10,514,030 | B2 | 12/2019 | Horning et al. |
| 10,815,990 | B2 | 10/2020 | Shultz et al. |
| 11,035,359 | B2 | 6/2021 | Thompson et al. |
| 11,286,926 | B2 | 3/2022 | Thompson et al. |
| 11,396,871 | B1 | 7/2022 | Thompson et al. |
| 11,530,697 | B2 | 12/2022 | Thompson et al. |
| 11,732,708 | B2 | 8/2023 | Thompson et al. |
| 11,873,809 | B2 * | 1/2024 | Thompson ............ F04B 53/147 |
| 11,891,991 | B2 * | 2/2024 | Thompson .......... F15B 15/1438 |
| 11,927,183 | B2 * | 3/2024 | Thompson ............ F04B 53/162 |
| 11,927,184 | B2 * | 3/2024 | Thompson ............ F04B 53/144 |
| 2001/0029838 | A1 | 10/2001 | Blenkush et al. |
| 2002/0079016 | A1 | 6/2002 | Webb |
| 2003/0161746 | A1 | 8/2003 | Asayama et al. |
| 2005/0089427 | A1 | 4/2005 | Riley et al. |
| 2006/0162549 | A1 | 7/2006 | Wang |
| 2006/0292016 | A1 | 12/2006 | Hitter et al. |
| 2008/0286120 | A1 | 11/2008 | Noord |
| 2012/0291920 | A1 | 11/2012 | Grisley |
| 2013/0039789 | A1 | 2/2013 | Donado-Munoz |
| 2013/0078125 | A1 | 3/2013 | Headley et al. |
| 2013/0183173 | A1 | 7/2013 | Kohli et al. |
| 2013/0233421 | A1 | 9/2013 | Furet et al. |
| 2013/0256426 | A1 | 10/2013 | Becker et al. |
| 2013/0258426 | A1 | 10/2013 | Tsumekawa |
| 2014/0034754 | A1 | 2/2014 | Thompson et al. |
| 2014/0219819 | A1 | 8/2014 | Roman et al. |

FOREIGN PATENT DOCUMENTS

| | | | |
|---|---|---|---|
| CN | 2473348 | Y | 1/2002 |
| CN | 1714236 | A | 12/2005 |
| CN | 1298990 | C | 2/2007 |
| CN | 201041118 | Y | 3/2008 |
| CN | 201189501 | Y | 2/2009 |
| CN | 101617162 | A | 12/2009 |
| CN | 201827066 | U | 5/2011 |
| CN | 102202802 | A | 9/2011 |
| CN | 103298564 | A | 9/2013 |
| CN | 103814213 | A | 5/2014 |
| CN | 105121867 | A | 12/2015 |
| FR | 2681646 | A1 | 3/1993 |
| GB | 1408095 | A | 10/1975 |
| JP | 2000145577 | A | 5/2000 |
| JP | 2011220223 | A | 11/2011 |
| KR | 200296106 | Y1 | 11/2002 |
| WO | 03002257 | A2 | 1/2003 |
| WO | 2006037671 | A1 | 4/2006 |

OTHER PUBLICATIONS

Chinese Office Action Application No. 2015800635074, dated Jul. 30, 2018, 31 pages.

Chinese Office Action for CN Application No. 2015800634936, dated Jan. 16, 2019, 5 pages.

Chinese Office Action for CN Application No. 2015800634936, dated May 11, 2018, 9 pages.

Communication Pursuant to Article 94(3) EP for EP Application No. 15876265.8, Dated Oct. 25, 2021, pp. 7.

(56) References Cited

OTHER PUBLICATIONS

Extended European Search Report for EP Application No. 15876252.6, dated Jun. 6, 2018, 10 pages.
Extended European Search Report for EP Application No. 15876263.3, dated May 29, 2018, 13 pages.
Extended European Search Report for EP Application No. 15876265.8, dated Jun. 5, 2018, 12 pages.
First Chinese Office Action for CN Application No. 2019111203407, Dated Dec. 21, 2020, pp. 20.
First Communication Pursuant to Article 94(3) EPC for EP Application No. 15876252.6, Dated Sep. 19, 2019, pp. 4.
First Communication Pursuant to Article 94(3) EPC for EP Application No. 15876263.3, Dated Sep. 3, 2020, pp. 4.
Graco, "Electric Airless Sprayers," 309674P, pp. 1-32, Manual.
International Preliminary Report on Patentability for PCT Application No. PCT/US2015/068049, Dated Jul. 4, 2017, pp. 9.
International Preliminary Report on Patentability for PCT Application No. PCT/US2015/068074, Dated Jul. 4, 2017, pp. 15.
International Preliminary Report on Patentability for PCT Application No. PCT/US2015/068080, Dated Jul. 4, 2017, pp. 15.
International Search Report and Written Opinion, for PCT Application No. PCT/US2015/068049, dated Mar. 29, 2016, 12 pages.
International Search Report and Written Opinion, for PCT Application No. PCT/US2015/068074, dated Mar. 25, 2016, 18 pages.
International Search Report and Written Opinion, for PCT Application No. PCT/US2015/068080, dated Mar. 29, 2016, 17 pages.
Second Chinese Office Action for CN Application No. 2015800634940, Dated Apr. 10, 2019, pp. 10.
Second Chinese Office Action for CN Application No. 2015800635074, Dated Apr. 1, 2019, pp. 16.
Second Chinese Office Action for CN Application No. 2019111203407, Dated Aug. 20, 2021, pp. 30.
Second Communication Pursuant to Article 94(3) EPC for EP Application No. 15876252.6, Dated Feb. 3, 2020, pp. 4.
Second Communication Pursuant to Article 94(3) EPC for EP Application No. 15876263.3, Dated Feb. 8, 2021, pp. 7.
Third Chinese Office Action for CN Application No. 2015800634940, Dated Sep. 29, 2019, pp. 11.
Third Chinese Office Action for CN Application No. 201911120340.7, Dated Jan. 13, 2022, pp. 19.
Third Communication Pursuant to Article 94(3) EPC for EP Application No. 15876252.6, Dated Dec. 9, 2021, pp. 7.
Third Communication Pursuant to Article 94(3) EPC for EP Application No. 15876263.3, Dated Dec. 7, 2021, pp. 7.
Fourth Communication Pursuant to Article 94(3) EPC for EP Application No. 15876263.3, Dated Jan. 3, 2023, pp. 5.
Second Communication to Article 94(3) EPC for EP Application No. 15876265.8, Dated Dec. 22, 2022, pp. 6.
First Chinese Office Action for CN Application No. 202210644532.3, Dated Jun. 2, 2023, pp. 18.
Operation Manual: 390™ Electric Airless Sprayers, 310820A, Graco Inc., Dated Nov. 2004, pp. 36.
Parts Manual: 390™ Airless Sprayer, Model 248808, 310878B, Graco Inc., Dated Jan. 2005, Revised Feb. 2005, pp. 4.
Repair Manual: 390™ Airless Sprayer, 310824A, Graco Inc., Dated Dec. 2004, pp. 30.
Repair Manual: 390™ Electric Airless Sprayer for models 253958, 826084, 254968, 254969, 254998, 253961; 311737A, Graco Inc., Dated Aug. 2006, pp. 30.
Extended European Search Report for EP Application No. 23174245.3, Dated Jul. 25, 2023, pp. 17.

* cited by examiner

PUMP ROD AND DRIVING LINK WITH SIDE-LOAD REDUCING CONFIGURATION

CROSS-REFERENCE TO RELATED APPLICATION(S)

This application is a continuation of U.S. application Ser. No. 18/231,617 filed Aug. 8, 2023, for "DISPLACEMENT PUMP MOUNTING AND RETENTION," which in turn is a continuation of U.S. application Ser. No. 17/989,250 filed Nov. 17, 2022, for "DISPLACEMENT PUMP MOUNTING AND RETENTION," now U.S. Pat. No. 11,732,708, which in turn is a continuation of U.S. application Ser. No. 17/861,864 filed Jul. 11, 2022 for "DISPLACEMENT PUMP MOUNTING AND RETENTION," now U.S. Pat. No. 11,530,697, which in turn is a continuation of U.S. application Ser. No. 17/688,360 filed Mar. 7, 2022 for "DISPLACEMENT PUMP MOUNTING AND RETENTION," now U.S. Pat. No. 11,396,871, which in turn is a continuation of U.S. application Ser. No. 17/325,684 filed May 20, 2021 for "PUMP ROD AND DRIVING LINK WITH SIDE-LOAD REDUCING CONFIGURATION," now U.S. Pat. No. 11,286,926, which in turn is a continuation of U.S. application Ser. No. 16/696,255 filed Nov. 26, 2019 for "DISPLACEMENT PUMP MOUNTING AND RETENTION," now U.S. Pat. No. 11,035,359, which in turn is a continuation of U.S. application Ser. No. 14/984,212 filed Dec. 30, 2015 for "PUMP ROD AND DRIVING LINK WITH SIDE-LOAD REDUCING CONFIGURATION," now U.S. Pat. No. 10,502,206, which in turn claims priority to U.S. Provisional Application No. 62/097,791 filed Dec. 30, 2014, and entitled "PUMP ROD AND DRIVING LINK WITH SIDE-LOAD REDUCING CONFIGURATION," and claims priority to U.S. Provisional Application No. 62/097,800 filed Dec. 30, 2014, and entitled "THREAD-TIGHTENING, SELF-ALIGNING MOUNTING AND RETENTION SYSTEM," and claims priority to U.S. Provisional Application No. 62/097,804 filed Dec. 30, 2014, and entitled "INTEGRAL MOUNTING SYSTEM ON AXIAL RECIPROCATING PUMP," and claims priority to U.S. Provisional Application No. 62/097,806 filed Dec. 30, 2014, and entitled "CONVERSION OF THREAD MOUNTED PUMPS TO AXIAL CLAMP MOUNTING," the disclosures of which are hereby incorporated by reference in their entireties.

BACKGROUND

The present disclosure relates generally to fluid dispensing systems. More specifically, this disclosure relates to axial displacement pumps for fluid dispensing systems.

Fluid dispensing systems, such as fluid dispensing systems for paint, typically utilize axial displacement pumps to pull the fluid from a container and to drive the fluid downstream. The axial displacement pump is typically mounted to a drive housing and driven by a motor. The pump rod of the axial displacement pump is attached to a reciprocating drive that pushes and pulls the pump rod, thereby pulling fluid from a container and into the axial pump and then driving fluid downstream from the axial displacement pump. The pump rod is typically attached to the reciprocating drive by a pin passing through the pump rod and securing the pump rod to the reciprocating drive. Pinning the pump rod to the reciprocating drive or detaching the pump rod from the reciprocating drive requires loose parts and several tools and is a time-intensive process. Moreover, the pump rod may experience driving forces that are not coincident with the centerline of the displacement pump, thereby causing the pump rod to wear on various components of the axial displacement pump.

Axial displacement pumps are typically secured to fluid dispensing systems by being threaded into the drive housing. The end of the axial displacement pump through which the pump rod extends includes external threading mated to threading within the drive housing. The threaded connection is utilized to provide concentricity to the axial displacement pump and driving mechanism. Alternatively, axial dispensing pumps may be secured to the drive housing by a clamping mechanism integral with the drive housing.

SUMMARY

According to one embodiment, a pump rod includes a shaft having a first end and a second end, a head attached to the first end, and a load concentrating feature attached to and projecting from a top surface of the head. A load concentrating feature area is smaller than a head area.

According to another embodiment, a driving system for a displacement pump includes a pump rod and a driving link. The pump rod includes a shaft having a first end and a second end, a head extending from the first end, and a load concentrating feature attached to and projecting from a top surface of the head. The driving link includes a cylinder having a first end and a second end, a cavity extending into the first end, and a U-shaped flange extending into the cavity. The cavity is configured to receive the head of the pump rod, and the U-shaped flange is configured to secure the head within the cavity.

According to yet another embodiment, a driving link for a displacement pump includes a body having a first end and a second end, a slot extending into the first end, where the slot includes a forward-facing opening, a lower opening, and a contact surface disposed opposite the lower opening. The driving link further includes a U-shaped flange extending about the lower opening of the slot and projecting into the slot, and a load concentrating feature projecting from the contact surface and into the slot, the load concentrating feature contacting the driving link.

DETAILED DESCRIPTION

Figure 1:
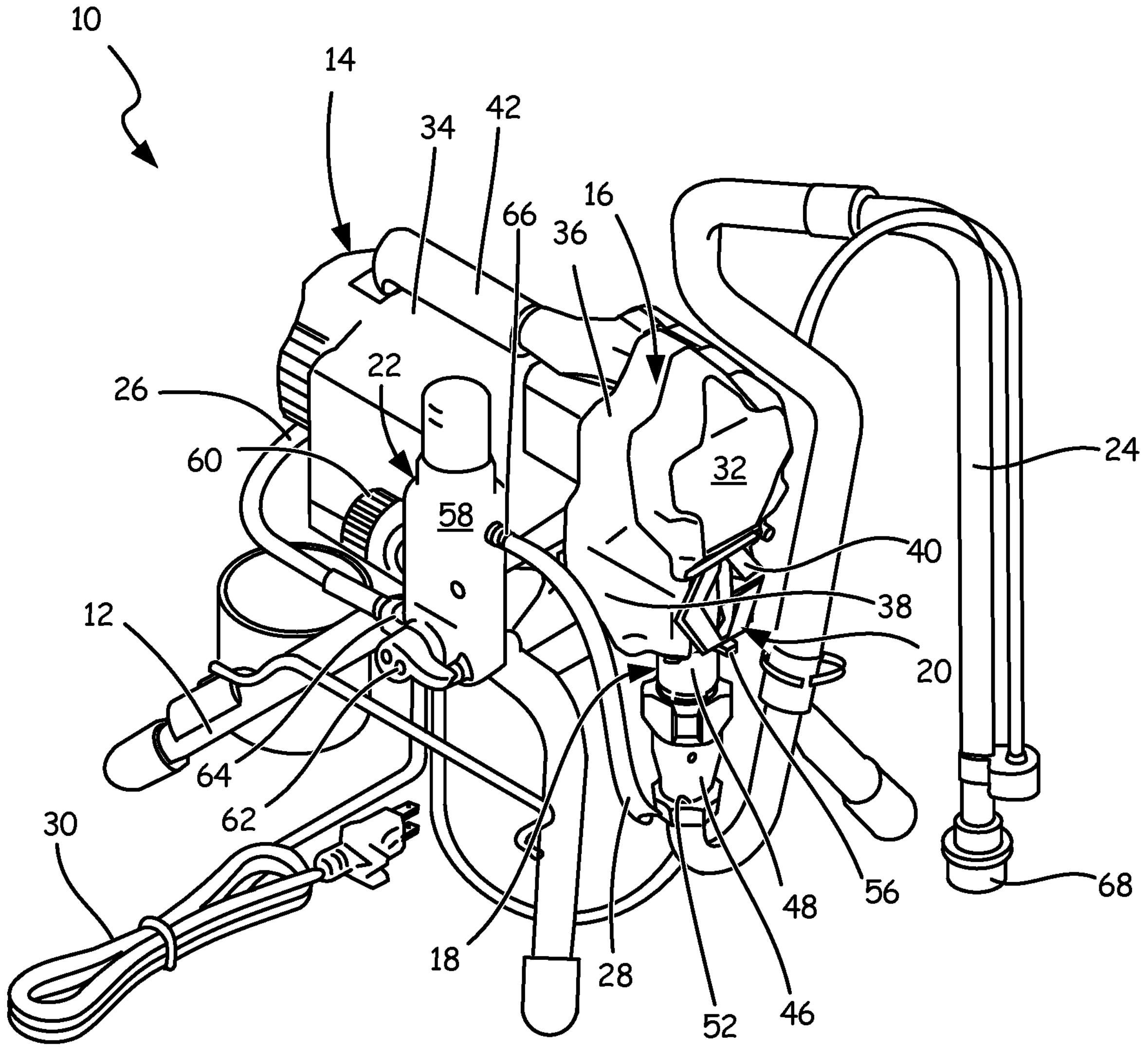
FIG. 1 is an isometric view of a fluid dispensing system.

FIG. 1 is an isometric view of fluid dispensing system 10. Fluid dispensing system 10 includes frame 12, motor section 14, drive housing 16, displacement pump 18, clamp 20, control system 22, intake hose 24, supply hose 26, dispensing hose 28, power cord 30, and housing cover 32. Motor section 14 includes motor housing 34. Drive housing 16 includes upper portion 36, lower portion 38, guard 40, and handle 42. Lower portion 38 includes mounting cavity 44 (shown in FIG. 2). Displacement pump 18 includes intake valve 46 and pump cylinder 48. Pump cylinder 48 includes fluid outlet 50 (shown in FIG. 2), and intake valve 46 includes fluid inlet 52. Clamp 20 includes axial ring 54 (shown in FIG. 2) and tightening ring 56. Control system 22 includes control housing 58, pressure control 60, and prime valve 62; and control housing 58 includes fluid inlet 64 and fluid outlet 66. Intake hose 24 includes strainer 68.

Fluid dispensing system 10 is configured to provide a pressurized fluid, such as paint, to a downstream user to allow the user to apply the fluid to a desired surface. Upper portion 36 and lower portion 38 are integrally connected to form drive housing 16. Handle 42 is secured to upper portion 36, and handle 42 allows a user to easily move fluid displacement system 10 by grasping handle 42. Guard 40 is hingedly attached to lower portion 38 and covers mounting cavity 44 (shown in FIG. 2) when guard 40 is in a closed position. Displacement pump 18 is mounted to lower portion 38 of drive housing 16, with a portion of pump cylinder 48 disposed within mounting cavity 44. Clamp 20 is disposed about pump cylinder 48, with axial ring 54 fixed to pump cylinder 48 and tightening ring 56 movably disposed on pump cylinder 48. When displacement pump 18 is installed, axial ring 54 is disposed within mounting cavity 44 and tightening ring 56 is disposed outside of mounting cavity 44. Tightening ring 56 is preferably rotatable about pump cylinder 48, and tightening ring 56 may be rotated until tightening ring 56 abuts drive housing 16. As such, tightening ring 56 and axial ring 54 exert a clamping force on drive housing 16 to secure displacement pump 18 to drive housing 16.

Intake hose 24 is connected to fluid inlet 52 of intake valve 46. Intake hose 24 can be inserted into a container holding fluid, and the fluid is drawn from the container through intake hose 24. Strainer 68 filters the fluid entering intake hose 24 to prevent particulate matter from interfering with the operation of fluid dispensing system 10. Supply hose 26 is connected to fluid outlet 50 of displacement pump 18 and supply hose is also connected to fluid inlet 64 of control housing 58. Dispensing hose 28 is connected to fluid outlet 66 of control housing 58, and dispensing hose 28 is configured to provide the fluid to a downstream dispenser (not shown), such as a spray gun, which can be controlled by the user.

Displacement pump 18 is driven by a motor (not shown) disposed within motor housing 34, and power cord 30 supplies electric power to the motor. As the motor drives displacement pump 18, displacement pump 18 draws the fluid from the container through intake hose 24 and drives the fluid downstream to control housing 58 through supply hose 26. Control system 22 allows a user to regulate the pressure of the fluid provided to the dispenser by adjusting pressure control 60 disposed on control housing 58. The fluid exits control housing 58 through fluid outlet 66 and proceeds downstream to the user through dispensing hose 28.

Clamp 20 and mounting cavity 44 allow displacement pump 18 to be easily installed and uninstalled within fluid dispensing system 10. With tightening ring 56 loosened, guard 40 may be hinged into an open position, thereby providing access to mounting cavity 44. Axial ring 54 is slidably disposed within mounting cavity 44 such that displacement pump 18 is removable by simply pulling displacement pump 18 out of mounting cavity 44. Displacement pump 18 may be fully uninstalled by then simply removing supply hose 26 and intake hose 24 from displacement pump 18. In a similar manner, displacement pump 18 may be installed within fluid dispensing system 10 by attaching supply hose 26 to displacement pump 18, opening guard 40, and sliding displacement pump 18 into mounting cavity 44. Axial ring 54 includes aligning features that ensure displacement pump 18 is properly aligned within mounting cavity 44. Once displacement pump 18 is slid into mounting cavity 44, guard 40 may be closed and tightening ring 56 may be rotated to abut lower portion 38. Tightening ring 56 secures displacement pump 18 to drive housing 16 and tightening ring 56 also secures guard 40 in the closed position. In this way, tightening ring 56 prevents guard 40 from becoming loosened during operation, which may expose various moving components of displacement pump 18.

Figure 2:
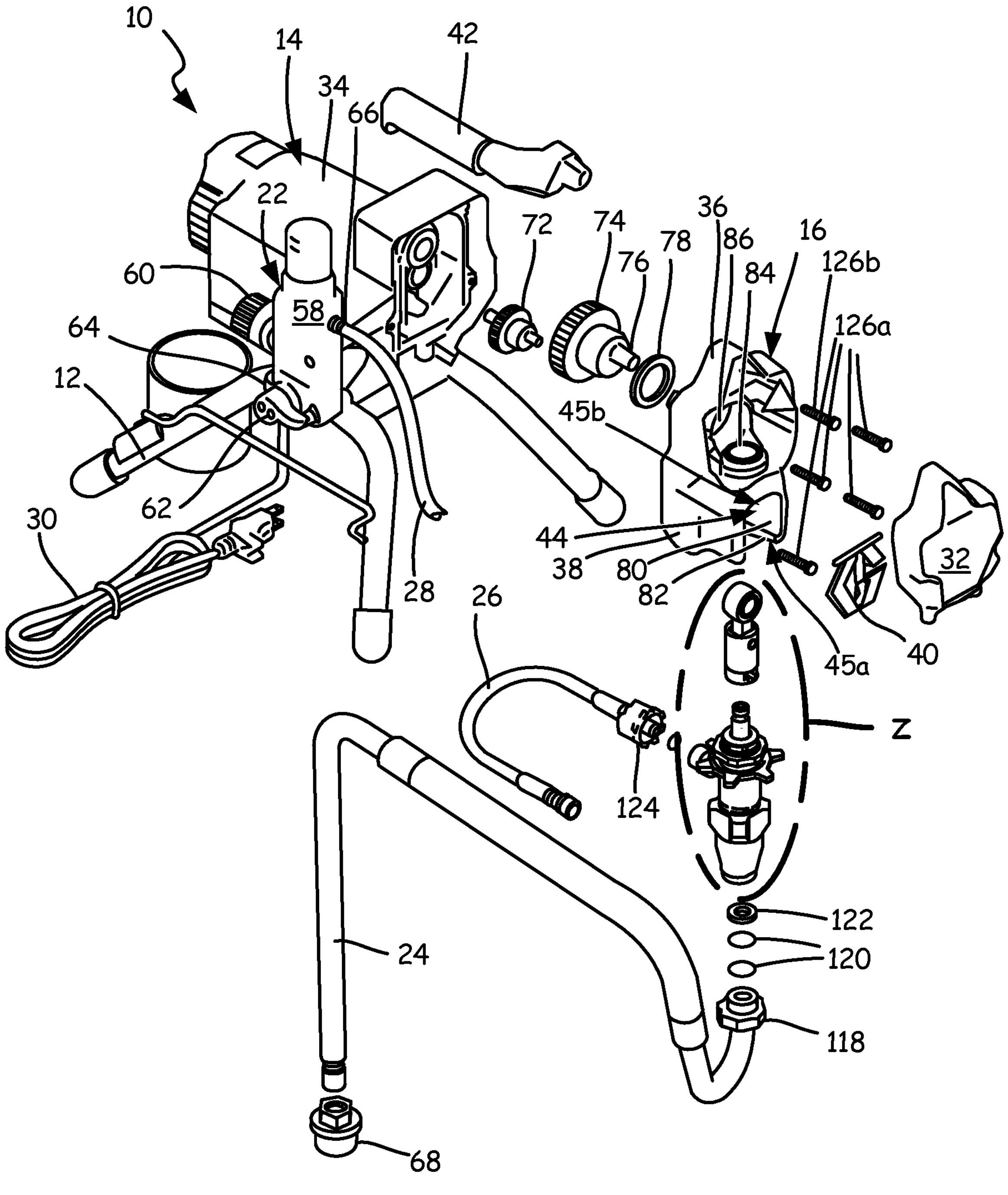
FIG. 2 is an exploded view of the fluid dispensing system shown in FIG. 1.
Figure 2A:
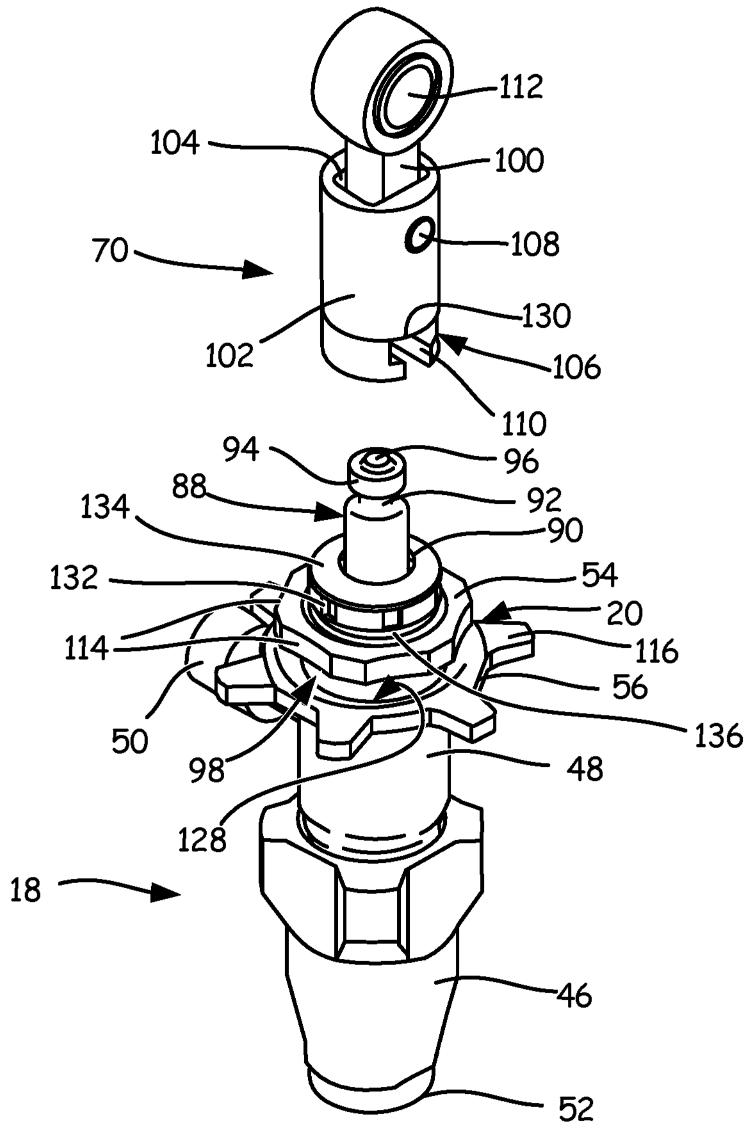
FIG. 2A is an enlarged view of detail Z of FIG. 2.

FIG. 2 is an exploded view of fluid dispensing system 10 shown in FIG. 1. FIG. 2A is an enlarged view of detail Z of FIG. 2. FIGS. 2 and 2A will be discussed together. Fluid dispensing system 10 includes frame 12, motor section 14, drive housing 16, displacement pump 18, clamp 20, control system 22, intake hose 24, supply hose 26, dispensing hose 28, power cord 30, housing cover 32, and reciprocating drive 70.

Motor section 14 includes motor housing 34, reduction gear 72, and drive gear 74. Drive gear 74 includes crankshaft 76. Motor section 14 further includes thrust bearing 78.

Drive housing 16 includes upper portion 36, lower portion 38, and guard 40. Lower portion 38 of drive housing 16 includes mounting cavity 44, first U-shaped flange 80, and protrusion 82. Upper portion 36 includes first opening 84 and second opening 86. Drive housing 16 further includes handle 42.

Displacement pump 18 includes intake valve 46, pump cylinder 48, and pump rod 88. Pump rod 88 includes neck 92, head 94 and load concentrating feature 96. Pump cylinder 48 includes fluid outlet 50 and aperture 90, and intake valve 46 includes fluid inlet 52. Displacement pump further includes packing nut 132, plug 134, and o-ring 136.

Clamp 20 includes axial ring 54 and tightening ring 56. Gap 98 is formed between axial ring 54 and tightening ring 56. Axial ring 54 includes alignment features 114 (shown in FIG. 11A). Tightening ring 56 includes radial projections or tabs 116, and tightening ring includes aligning cone 128.

Control system 22 includes control housing 58, pressure control 60, and prime valve 62, and control housing 58 includes fluid inlet 64 and fluid outlet 66.

Reciprocating drive 70 includes connecting rod 100 and drive link 102. Drive link 102 includes connecting slot 104, drive cavity 106, wrist pin hole 108, second U-shaped flange 110, and contact surface 130. Connecting rod 100 includes follower 112.

Intake hose 24 includes strainer 68 and intake nut 118. O-rings 120 and washer 122 are disposed between intake hose 24 and displacement pump 18. Supply hose 26 includes supply nut 124.

Frame 12 supports motor section 14, and drive housing 16 is mounted to motor section 14. Fasteners 126*a* extend through drive housing 16 and into motor section 14 to secure drive housing 16 to motor section 14. Handle 42 is attached to drive housing 16 by fastener 126*b* extending through drive housing 16 and into handle 42. Housing cover 32 is attached to and encloses upper portion 36.

Reduction gear 72 is attached to and driven by the motor, with the reduction gear 72 intermeshed with and providing power to drive gear 74. Crankshaft 76 extends into upper portion 36 of drive housing 16 thorough second opening 86 and engages connecting rod 100 by extending through follower 112. Upper portion 36 of drive housing 16 is integral with lower portion 38 of drive housing 16. Second opening 86 extends through a rearward side of upper portion 36. First opening 84 extends through a lower end of upper portion 36 and an upper end of lower portion 38 and provides an opening extending between upper portion 36 and lower portion 38. Mounting cavity 44 extends into lower portion 38, and first U-shaped flange 80 is disposed about a lower opening 45*a* of mounting cavity 44 and extends into mounting cavity 44, the lower opening 45*a* can also be referred to as a housing opening. Protrusion 82 is integral with first U-shaped flange 80 and extends downward from first U-shaped flange 80. Guard 40 is hingedly connected to drive housing 16 and mounted such that guard 40 covers a forward-facing opening 45*b* of mounting cavity 44 when guard 40 is in a closed position and guard 40 allows a user to access mounting cavity 44 when guard 40 is in an open position, the forward-facing opening 45*b* can also be referred to as a housing opening.

Reciprocating drive 70 is disposed within drive housing 16. Connecting rod 100 is disposed within upper portion 36 and drive link 102 extends through first opening 84 and into lower portion 38 of drive housing 16. Drive link 102 is preferably cylindrical, but it is understood that drive link 102 may be of any suitable shape to such that drive link 102 is capable of reciprocating through first opening 84 of drive housing 16. For example, if first opening 84 were square, then drive link 102 may similarly be shaped to easily translate through the square-shaped opening, such as a box or a cube. With drive link 102 extending through first opening 84, an end of drive link 102 including drive cavity 106 is disposed within mounting cavity 44. Second U-shaped flange 110 extends about a lower opening of drive cavity 106 and projects into drive cavity 106. Connecting slot 104 extends into an end of drive link 102 opposite drive cavity 106, and connecting slot 104 is configured to receive connecting rod 100. Wrist pin hole 108 extends through drive link 102 and into connecting slot 104, and wrist pin hole 108 is configured to receive a fastener, such as a wrist pin, to secure connecting rod 100 within connecting slot 104. Connecting rod 100 is pinned by the fastener within connecting slot 104 such that connecting rod 100 is free to follow crankshaft 76 and connecting rod 100 translates the rotational motion of crankshaft 76 into axial motion of drive link 102, thereby driving drive link 102 in a reciprocating manner.

Intake valve 46 is secured to pump cylinder 48 to form a body of displacement pump 18. Pump rod 88 extends into pump cylinder 48 through aperture 90. Pump rod 88 is partially disposed within pump cylinder 48 and extends out of pump cylinder 48 through aperture 90. Load concentrating feature 96 projects from a top of head 94. O-rings 120 and washer 122 are disposed between intake hose 24 and intake valve 46. Intake hose 24 is secured to displacement pump 18 by intake nut 118 being screwed onto intake valve 46 around fluid inlet 52. Supply hose 26 is connected to pump cylinder 48, with supply nut 124 engaging fluid outlet 50.

Clamp 20 is disposed about pump cylinder 48 of displacement pump 18. Clamp 20 is disposed proximate a distal end of pump cylinder 48. Axial ring 54 is fixed to pump cylinder 48. Axial ring 54 is fixed to pump cylinder 48 such that axial ring 54 aligns displacement pump 18 within mounting cavity 44 when displacement pump 18 is installed. Axial ring 54 is fixed to ensure that displacement pump 18 does not rotate or experience unwanted axial movement during operation. Unlike axial ring 54, tightening ring 56 is movably disposed on pump cylinder 48 such that tightening ring 56 may be shifted to either enlarge or reduce gap 98. Tightening ring 56 may be shifted to abut a lower edge of first U-shaped flange 80 to secure displacement pump 18, and tightening ring 56 may be shifted to enlarge gap 98 to allow displacement pump 18 to be removed from mounting cavity 44. While tightening ring 56 may be movable in any manner suitable, tightening ring 56 preferably includes internal threading configured to engage external threading formed on pump cylinder 48 such that tightening ring is rotatable about pump cylinder 48.

With displacement pump 18 installed, pump rod 88 is disposed within mounting cavity 44 and pump rod 88 engages drive link 102. With pump rod 88 engaging drive link 102, head 94 is disposed within drive cavity 106 of drive link 102, and head 94 is retained within drive cavity 106 by second U-shaped flange 110 extending about neck 92. Axial ring 54 is disposed within mounting cavity 44 and rests on a top side of first U-shaped flange 80. Alignment features 114 are shown as a plurality of flat edges, which ensure proper alignment of displacement pump 18 and prevent rotation of displacement pump 18 during operation. First U-shaped flange 80 is disposed between axial ring 54 and tightening ring 56 within gap 98. After displacement pump is inserted into mounting cavity 44, a user may close guard 40 to enclose mounting cavity 44. Displacement pump 18 is secured in position by rotating tightening ring 56 such that tightening ring 56 and axial ring 54 exert a clamping force on first U-shaped flange 80. A user may manually tighten tightening ring 56 by rotating tightening ring 56 about displacement pump 18. When tightening ring 56 is fully tightened, tightening ring 56 receives protrusion 82.

In operation, pump rod 88 is pulled into an upstroke to draw fluid into intake valve 46 through fluid inlet 52 while simultaneously driving fluid downstream from pump cylinder 48 through fluid outlet 50. After the upstroke is completed, pump rod 88 is pushed into a downstroke to drive the fluid from intake valve 46 and into pump cylinder 48. During a downstroke, fluid is free to flow from intake valve 46, to pump cylinder 48, and downstream through fluid outlet 50. Fluid is thus loaded into displacement pump 18 when pump rod 88 is pulled into an upstroke, while fluid is displaced downstream during both the upstroke and the downstroke. Drive gear 74 is driven by the motor through reduction gear 72. As drive gear 74 rotates, connecting rod 100 follows crankshaft 76 due to crankshaft 76 extending through follower 112. Connecting rod 100 translates the rotational motion of crankshaft 76 into reciprocating motion and drives drive link 102 in a reciprocating manner. Drive link 102 drives pump rod 88 though the connection of head 94 within drive cavity 106. While head 94 is received within drive cavity 106, head 94 is not in contact with a contact surface of drive cavity 106. Instead, load concentrating feature 96 abuts the contact surface of drive cavity 106 and prevents a periphery of head 94 from coming in contact with the contact surface. As such, when drive link 102 exerts a compressive force on pump rod 88, while driving pump rod 88 in a downstroke, the compressive force is experienced by load concentrating feature 96 and transmitted to the rest of pump rod 88. Drive link 102 pulls pump rod 88 into an upstroke by second U-shaped flange 110 engaging a lower edge of head 94. Displacement pump 18 thereby draws fluid from a container through intake hose 24, drives the fluid downstream to control system 22 through supply hose 26, and drives the fluid through dispensing hose 28 and to a dispenser.

An area of load concentrating feature 96 is smaller than an area of head 94. Load concentrating feature 96 projects from head 94 and prevents a periphery of head 94 from engaging a contact surface of drive link 102. In addition, the smaller area of load concentrating feature 96 reduces the misalignment of compressive forces between drive link 102 and pump rod 88. Load concentrating feature 96 minimizes a distance from an edge of load concentrating feature 96, where some contact is made with the contact surface of drive link 102, to the centerline of drive link 102, where the force is applied. Minimizing the misalignment of the forces reduces the moment couple that is formed between the drive link 102 and pump rod 88, ultimately reducing side loading of displacement pump 18. Minimizing the misalignment of the forces prevents harmful heat, friction, and wear from building on the scaling and aligning surfaces, thereby increasing the useful life of those surfaces, of pump rod 88, and of displacement pump 18.

Load concentrating feature 96 is preferably a cylindrical projection extending from head 94, but it is understood that load concentrating feature 96 may be of any configuration suitable for minimizing the misalignment of forces experienced by pump rod 88, such as a conical point, a hemispherical projection, a cubic projection, or may be any other suitable shape. Moreover, while load concentrating feature 96 is described as extending from head 94, it is understood that drive link 102 may include a load concentrating feature extending from the contact surface of drive link 102 and contacting head 94. Having a load concentrating feature extend from the contact surface of drive link 102 will similarly minimize the misalignment of forces and prevent side loading on pump rod 88 by reducing the contact-surface area between drive link 102 and head 94, while ensuring that the load is experienced coincident with the centerline of pump rod 88.

Clamp 20 secures displacement pump 18 to drive housing 16. Clamp 20 further aligns displacement pump 18 and limits the stroke length of pump rod 88. Axial ring 54 is affixed to pump cylinder 48 at a desired location, and axial ring 54 limits the stroke length pump rod 88. Fixing axial ring 54 too low on pump cylinder 48 allows drive link 102 to drive pump rod 88 such a distance that pump rod 88 will bottom-out within pump cylinder 48, as drive link 102 drives pump rod 88 a set distance but a greater portion of displacement pump 18 would be disposed within mounting cavity 44. Pump rod 88 bottoming out would cause damage to pump cylinder 48, pump rod 88, and seals within displacement pump 18. Conversely, fixing axial ring 54 too high on pump cylinder 48 would result in a reduced stroke length for pump rod 88. Having too short of a stoke length reduces the downstream pressure that displacement pump 18 is capable of providing and reduces the efficiency of displacement pump 18. Therefore, axial ring 54 is fixed to pump cylinder 48 such that pump rod 88 is driven a desired stroke length.

Clamp 20 further ensures the concentricity of displacement pump 18 such that the driving forces from drive link 102 are experienced more closely coincident with a centerline of displacement pump 18, thereby reducing the wear experienced by displacement pump 18. When tightening ring 56 is fully tightened, tightening ring 56 receives protrusion 82 which extends from first U-shaped flange 80. Receiving protrusion 82 concentrically aligns displacement pump 18, pump rod 88, and drive link 102, thereby reducing the side loads experienced through pump rod 88. Reducing side loading on pump rod 88 reduces the wear experienced by scaling and alignment surfaces within displacement pump 18, thereby increasing the lifespan and efficiency of displacement pump 18. Moreover, receiving protrusion 82 provides additional structural integrity to drive housing 16. Tightening ring 56 fully encloses protrusion 82 thereby preventing drive housing 16 from being driven apart by forces experienced during operation. Guard 40 may include a second protrusion configured to mate with protrusion 82 such that second protrusion and protrusion 82 form a continuous ring about the lower opening of mounting cavity 44. Tightening ring 56 is configured to receive both protrusion 82 and the second protrusion. Receiving the second protrusion of guard 40 secures guard 40 in a closed position during operation of displacement pump 18.

Figure 3:
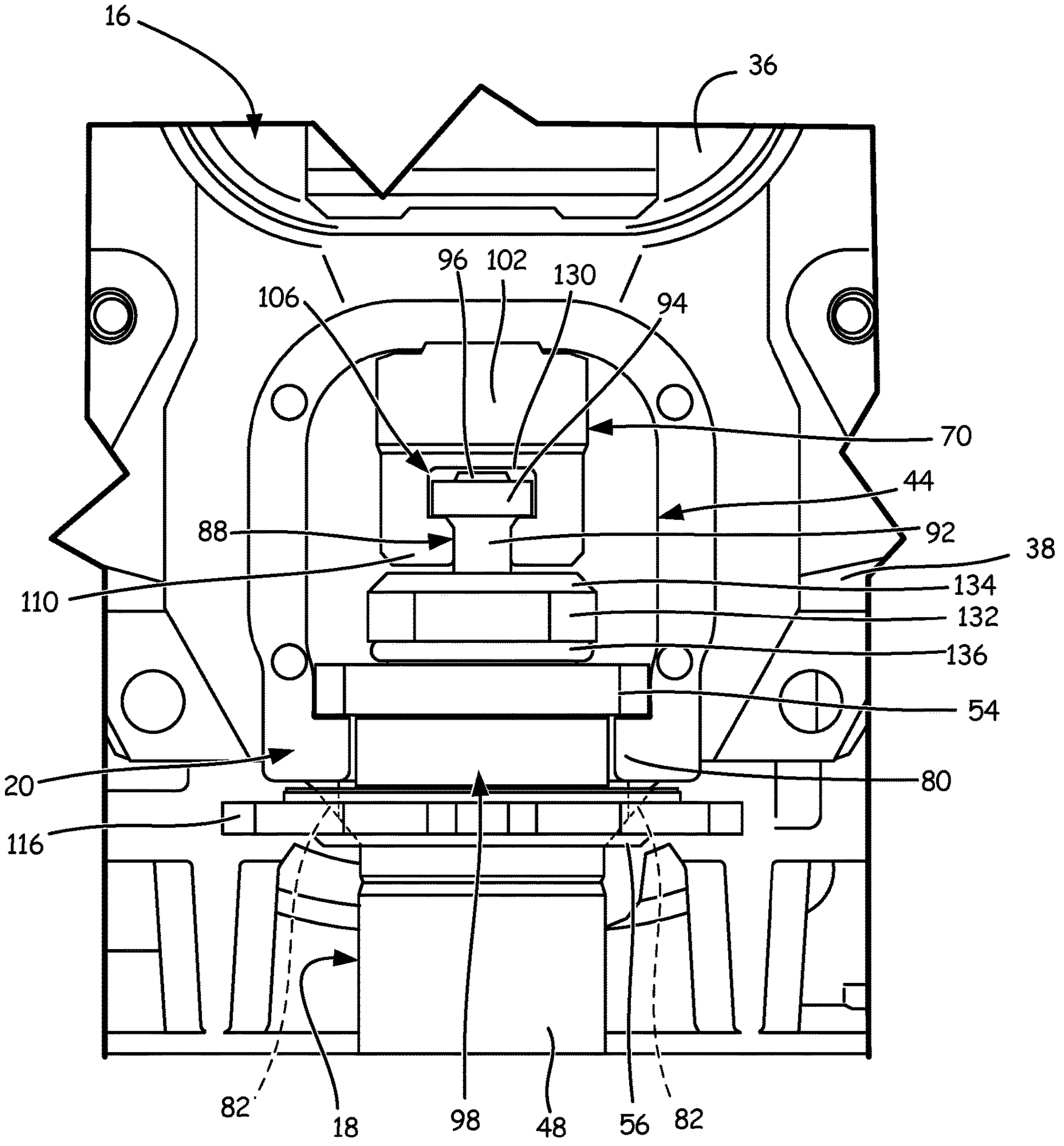
FIG. 3 is a partial, front elevation view of a fluid dispensing system showing the connection of a displacement pump and a reciprocating drive.

FIG. 3 is a partial, front elevation view of drive housing 16 showing the connection of displacement pump 18 and reciprocating drive 70. Drive housing 16 includes upper portion 36 and lower portion 38, and lower portion 38 includes mounting cavity 44, first U-shaped flange 80, and protrusion 82 (shown in dashed lines). Pump cylinder 48 and pump rod 88 of displacement pump 18 are shown. Pump rod 88 includes neck 92, head 94, and load concentrating feature 96. Clamp 20 includes axial ring 54 and tightening ring 56. Gap 98 is formed between axial ring 54 and tightening ring 56. Axial ring 54 includes alignment features 114 (shown in FIGS. 2A, 11A, and 12). Tightening ring 56 includes projections 116 and aligning cone 128 (shown in FIGS. 2A, 4, 10A, and 10B). Drive link 102 includes drive cavity 106 and second U-shaped flange 110. Drive cavity 106 includes contact surface 130. Displacement pump 18 further includes packing nut 132, plug 134, and o-ring 136.

Axial ring 54 is affixed proximate an end of pump cylinder 48 through which pump rod 88 extends. Tightening ring 56 is movably attached to pump cylinder 48 below axial ring 54. Gap 98 is formed between axial ring 54 and pump cylinder 48, and gap 98 receives first U-shaped flange 80 when displacement pump 18 is installed within mounting cavity 44. With displacement pump 18 installed, axial ring 54 rests on first U-shaped flange 80 and alignment features 114 of axial ring 54 abut the sides of mounting cavity 44. Alignment features 114 prevent rotation of axial ring 54 within mounting cavity 44, thereby preventing rotation of displacement pump 18. Clamp 20 secures and aligns displacement pump 18 by having tightening ring 56 abut the lower edge of first U-shaped flange 80, thereby causing axial ring 54 and tightening ring 56 to exert a clamping force on first U-shaped flange 80. Aligning cone 128 (shown in FIGS. 2A, 4, and 10B) of tightening ring 56 receives protrusion 82 when tightening ring 56 is adjusted to exert a clamping force. Tightening ring 56 preferably includes internal threading configured to engage an external threading disposed on pump cylinder 48 such that tightening ring 56 is rotatable about pump cylinder 48.

Pump rod 88 extends out of displacement pump 18 and engages drive link 62. Packing nut 132 is secured to displacement pump 18 with pump rod 88 extending through packing nut 132. Packing nut 132 secures pump rod 88 within displacement pump 18. O-ring is disposed between packing nut 132 and displacement pump 18. Plug 120 is secured to a top of packing nut 132, and plug 120 encloses packing nut 132.

When displacement pump 18 is secured to drive housing 16, head 94 of pump rod 88 is received within drive cavity 106 and second U-shaped flange 110 is disposed about neck 92. Load concentrating feature 96 projects from a top of head 94. With head 94 disposed within drive cavity 106, load concentrating feature 96 is disposed adjacent to contact surface 130 of drive link 102. Load concentrating feature 96 prevents contact surface 130 from directly contacting head 94 of pump rod 88. In this way, load concentrating feature 96 reduces the axial misalignment between pump rod 88 and drive link 102, thereby preventing excessive side loads from being transmitted to pump rod 88. As such, load concentrating feature 96 prevents excessive wear on the sealing and wear parts disposed within displacement pump 18, thereby increasing the lifespan of the various components of displacement pump 18.

Clamp 20 aligns pump rod 88 with displacement pump 18 and drive link 102. Aligning displacement pump 18 with drive link 102 prevents side loads from being transferred from drive link 102 to displacement pump 18, thereby reducing the wear experienced by the various parts of displacement pump 18. Tightening ring 56 receives protrusion 82 extending from first U-shaped flange 80 when tightening ring 56 is shifted to abut drive housing 16. Receiving protrusion 82 within aligning cone 128 concentrically aligns the centerline of displacement pump 18 with the centerline of drive link 102. Protrusion 82 preferably includes a sloped wall configured to mate with a sloped wall of aligning cone 128. The mating of the sloped walls ensures that displacement pump 18 is concentrically aligned with drive link 102 when tightening ring 56 is fully rotated to secure displacement pump 18 to drive housing 16. In addition, aligning cone 128 receiving protrusion 82 provides structural integrity to drive housing 16. Tightening ring 56 fully surrounds a lower opening of mounting cavity 44, and aligning cone 128 receives protrusion 82 to provide additional structural integrity about the lower opening, which 102 prevents lower portion 38 of drive housing 16 from being driven apart by forces experienced during operation of displacement pump 18.

Figure 4:
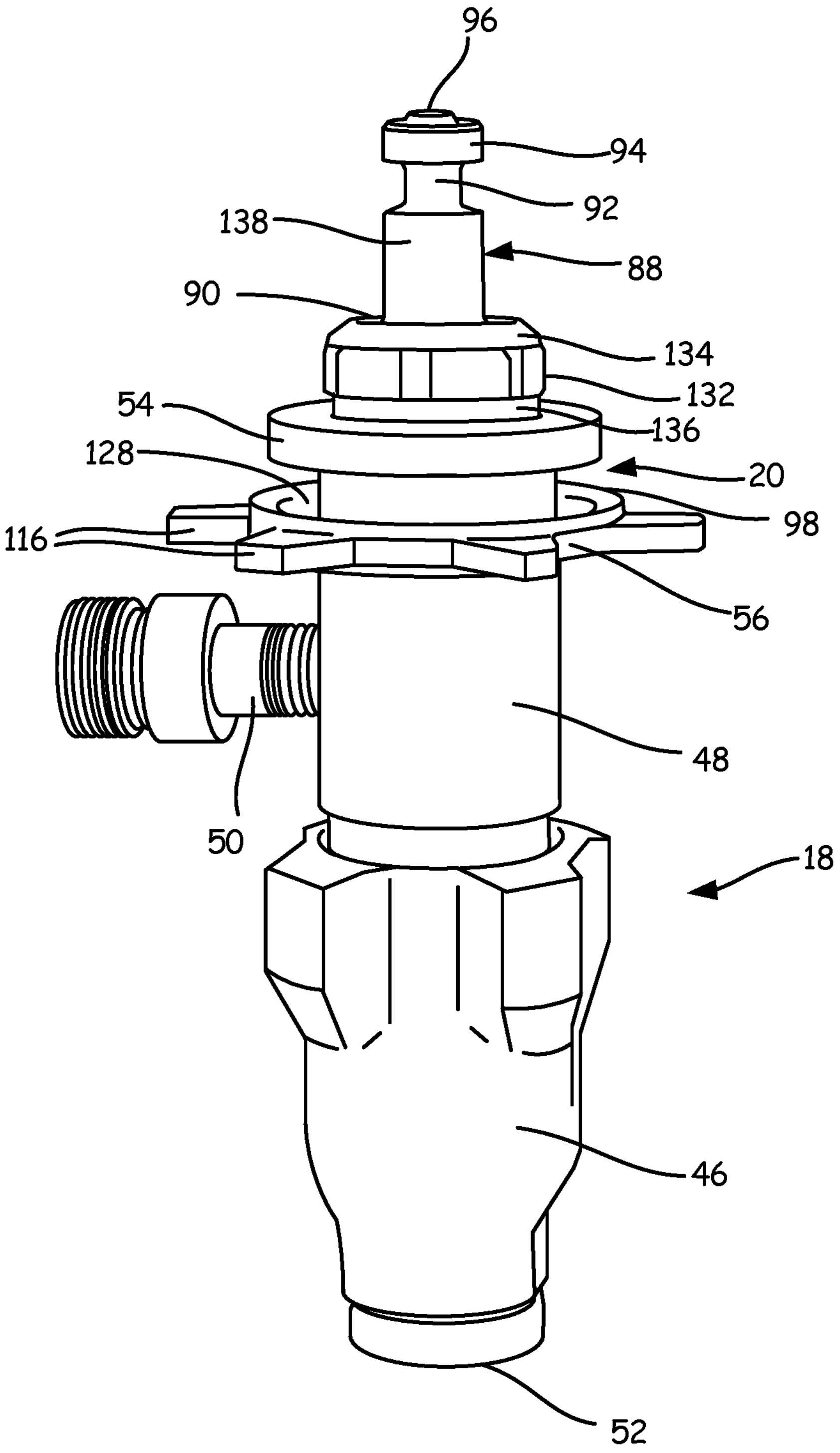
FIG. 4 is a side elevation view of a displacement pump.

FIG. 4 is a side elevation view of displacement pump 18 and clamp 20. Displacement pump 18 includes intake valve 46, pump cylinder 48, pump rod 88, packing nut 132, plug 134, and o-ring 136. Intake valve 46 includes fluid inlet 52 and pump cylinder 48 includes fluid outlet 50 and aperture 90. Pump rod 88 includes neck 92, head 94, load concentrating feature 96, and shaft 138. Clamp 20 includes axial ring 54 and tightening ring 56. Axial ring 54 includes alignment features 114, and tightening ring 56 includes aligning cone 128 and projections 116. Gap 98 is formed between and defined by axial ring 54 and tightening ring 56.

Intake valve 46 is secured to pump cylinder 48, and pump rod 88 extends into pump cylinder 48 through aperture 90. A portion of shaft 138 along with neck 92, head 94, and load concentrating feature 96 are disposed outside of pump cylinder 48. Another portion of shaft 138 extends into pump cylinder 48. Displacement pump 18 is configured to draw a fluid through fluid inlet 52 and to drive the fluid downstream through fluid outlet 50. Pump rod 88 is coincident with the centerline of displacement pump 18 to draw the fluid into displacement pump 18 and to drive the fluid out of displacement pump 18.

Clamp 20 is disposed about pump cylinder 48 proximate a distal end of pump cylinder 48. Axial ring 54 is fixed to pump cylinder 48 and tightening ring 56 is movably disposed about pump cylinder 48. Tightening ring 56 is mounted on pump cylinder 48 inboard of axial ring 54. Tightening ring 56 is preferably rotatable about pump cylinder 48 such that a user may rotate tightening ring 56 to either increase or reduce the size of gap 98. As such, tightening ring 56 may be rotated such that clamp 20 exerts a clamping force on an object disposed within gap 98 to secure displacement pump 18 at a desired location.

Pump rod 88 is configured to be driven by a driver, such as reciprocating drive 70 (shown in FIG. 2). In operation, pump rod 88 is pulled into an upstroke to draw fluid into intake valve 46 through fluid inlet 52 while simultaneously driving fluid downstream from pump cylinder 48 through fluid outlet 50. After completing the upstroke, pump rod 88 is pushed into a downstroke to drive the fluid from intake valve 46 and into pump cylinder 48. During a downstroke, fluid is free to flow from intake valve 46, to pump cylinder 48, and downstream through fluid outlet 50. Fluid is thus loaded into displacement pump 18 when pump rod 88 is pulled into an upstroke, while fluid is displaced downstream during both the upstroke and the downstroke. Load concentrating feature 96 projects from head 94 and load concentrating feature 96. Load concentrating feature 96 prevents head 94 from abutting the contact surface of the driver, thereby preventing a periphery of head 94 from being loaded.

An area of load concentrating feature 96 is preferably smaller than an area of head 94. The smaller area of load concentrating feature 96 concentrates compressive forces near the centerline of pump rod 88, which reduces the effect of any side loads that may be transmitted to pump rod 88. As such, load concentrating feature 96 ensures that the driving force transmitted through load concentrating feature 96 is more closely coincident with centerline of displacement pump 18. Ensuring that the load is coincident with the centerline reduces the buildup of harmful heat, friction, and wear on the scaling and aligning surfaces contained within displacement pump 18. In this way, load concentrating feature 96 reduces side loading and increases the efficiency and lifespan of displacement pump 18. While load concentrating feature 96 is shown as a circular projection extending from head 94, it is understood that load concentrating feature may be a hemisphere, a box, a cone, or any other suitable shape for preventing loading on the periphery of head 94 and reducing the misalignment of the load to the centerline of the pump rod 88.

Figure 5:
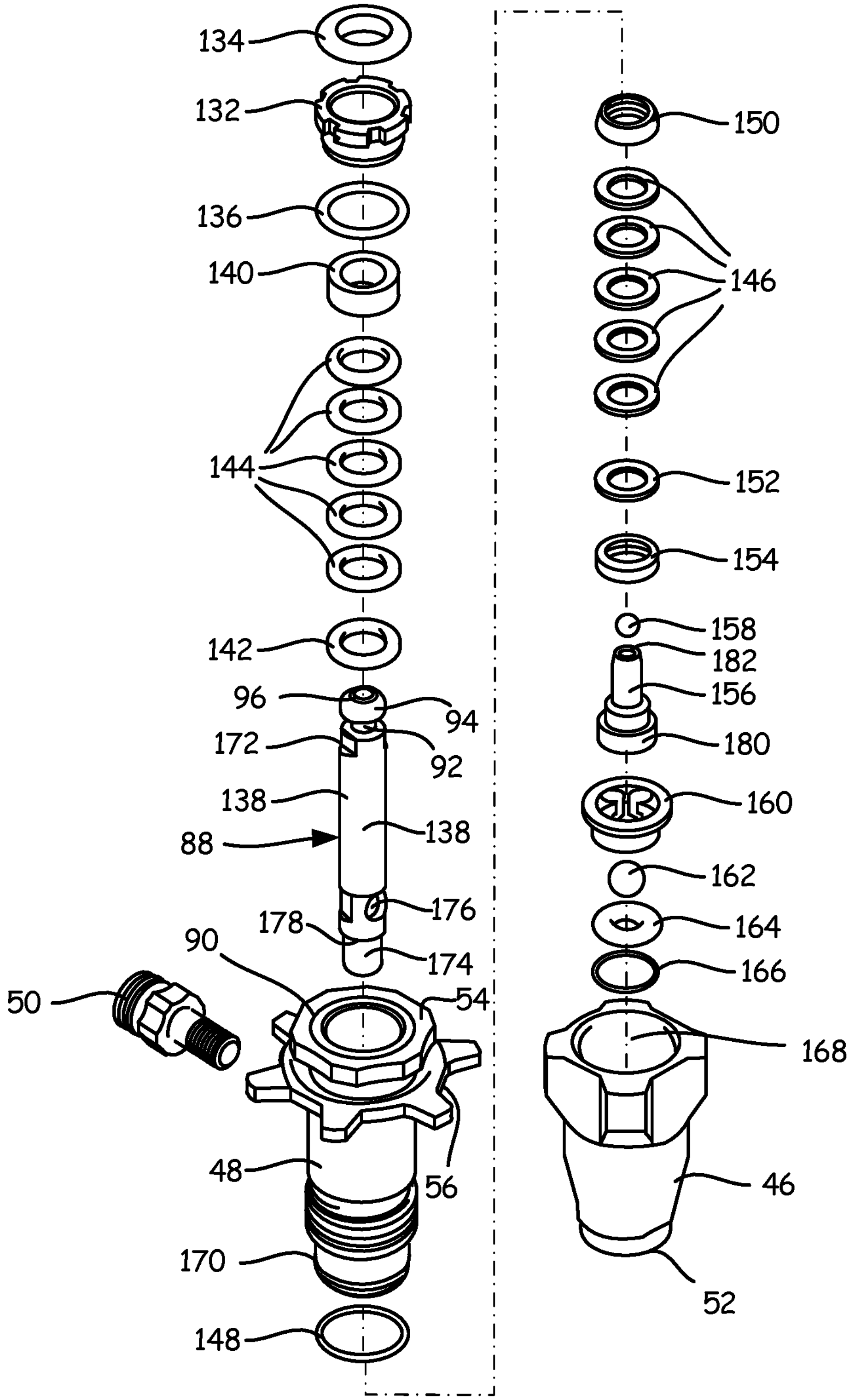
FIG. 5 is an exploded view of the displacement pump of FIG. 4.

FIG. 5 is an exploded view of displacement pump 18. Clamp 20 is disposed on displacement pump 18 proximate aperture 90. Displacement pump 18 includes intake valve 46, pump cylinder 48, pump rod 88, packing nut 132, plug 134, o-ring 136, first throat gland 140, second throat gland 142, throat packings 144, piston packings 146, second o-ring 148, first piston gland 150, second piston gland 152, piston guide 154, piston valve 156, outlet ball 158, ball guide 160, inlet ball 162, inlet seat 164, and third o-ring 166. Intake valve 46 includes fluid inlet 52 and fluid outlet 168. Pump cylinder 48 includes fluid outlet 50, aperture 90, and fluid inlet 170. Pump rod 88 includes first end 172, second end 174, shaft 138, neck 92, head 94, load concentrating feature 96, fluid passage 176, and shoulder 178. Piston valve 156 includes valve head 180 and outlet seat 182. Clamp 20 includes axial ring 54 and tightening ring 56. Gap 98 is disposed between and defined by axial ring 54 and tightening ring 56.

Pump rod 88 extends through aperture 90 and into pump cylinder 48. Throat packings 144 are disposed within pump cylinder 48 proximate aperture 90. Throat packings 144 are received between and secured together by first throat gland 140 and second throat gland 142. Pump rod 88 is slidable through throat packings 144, and throat packings 144 form a seal to prevent a fluid from exiting pump cylinder 48 through aperture 90. Packing nut 132 is disposed about pump rod 88 and is secured within aperture 90 of pump cylinder 48. O-ring 136 extends around aperture 90 and forms a seal between packing nut 132 and pump cylinder 48. Packing nut 132 preferably includes external threading configured to engage with internal threading on an inner wall of pump cylinder 48. Packing nut 132 retains throat packings 144 within pump cylinder 48. Plug 134 is secured to and encloses a top of packing nut 132.

First end 172 of pump rod 88 includes neck 92 and head 94. Neck 92 extends from shaft 138 and connects head 94 to shaft 138. Load concentrating feature 96 projects from a top of head 94, and load concentrating feature 96 is aligned with a centerline of pump rod 88. Fluid passage 176 extends through shaft 138, and shaft 138 is hollow between second end 174 and fluid passage 176. Outlet ball 158 is disposed within the hollow portion of pump rod 88, and piston valve 156 is configured to screw into the hollow portion of shaft 138 to retain outlet ball 158 within pump rod 88. Piston valve 156 is hollow to allow a fluid to flow through piston valve 156 and to fluid passage 176. Piston packings 146 are disposed about shaft 138 and are retained between first piston gland 150 and second piston gland 152. First piston gland 150 is retained by shoulder 178 and second piston gland 152 is retained by valve head 180. Piston packings 146 are retained such that piston packings 146 shift axially with pump rod 88 as pump rod 88 is pushed into a downstroke or pulled into an upstroke. In this way, first piston gland 150, piston packings 146, and second piston gland 152 form the head of a piston within displacement pump 18.

Pump cylinder 48 is secured to intake valve 46 with second o-ring 148 disposed about fluid inlet 170 and forming a seal at the connection of pump cylinder 48 and intake valve 46. Inlet seat 164 is fixed within intake valve 46 proximate fluid inlet 52. Third o-ring 166 is disposed within intake valve 46 and forms a seal about inlet seat 164. Ball guide 160 is also fixed within intake valve 46, and ball guide 160 is disposed proximate inlet seat 164. Inlet ball 162 is disposed between inlet seat 164 and ball guide 160.

Axial ring 54 is fixed to pump cylinder 48 proximate aperture 90. Tightening ring 56 is disposed on pump cylinder 48 below axial ring 54. Tightening ring 56 is movable to either increase or decrease the size of gap 98. Clamp 20 is configured such that gap 98 receives a projection, such as first U-shaped flange 80 (shown in FIGS. 2 and 3), and tightening ring 56 is moved to reduce the size of gap 98 such that axial ring 54 and tightening ring 56 exert a clamping force on the projection. As such, clamp 20 secures displacement pump 18 during operation of displacement pump 18.

When piston rod 88 is pulled into an upstroke, outlet ball 158 is forced onto outlet seat 182. With outlet ball 158 engaging outlet seat 182 a seal is formed by outlet ball 158, outlet seat 182, and piston packings 146 that prevents fluid from flowing upstream from pump cylinder 48 into intake valve 46. Instead, the fluid within pump cylinder 48 is driven out of pump cylinder 48 through fluid outlet 50. At the same time as fluid is driven downstream from pump cylinder 48, fluid is drawn into intake valve 46 through fluid inlet 52, thereby loading displacement pump 18. As piston rod 88 is pulled into an upstroke inlet ball 162 is pulled off of inlet seat 164. Inlet ball 162 is prevented from freely moving within intake valve 46 by ball guide 160, which allows inlet ball 162 to move off of inlet seat 164 a sufficient distance for fluid to flow into intake valve 46 through fluid inlet 52, inlet seat 164, and ball guide 160. After pump rod 88 completes an upstroke, pump rod 88 is pushed into a downstroke.

When piston rod 88 is pushed into a downstroke, inlet ball 162 is forced onto inlet seat 164. Inlet ball 162 engaging inlet seat 164 prevents fluid from back-flowing upstream out of intake valve 46. Outlet ball 158 is disengaged from outlet seat 182, and outlet ball shifts upward opening a flow path between intake valve 46 and pump cylinder 48 and through piston valve 156. As pump rod 88 shifts downward, the fluid that was drawn into intake valve 46 during the upstroke is forced through piston valve 156 and enters pump cylinder 48 through fluid passage 176. During the downstroke the fluid is free to flow downstream through fluid outlet 50. In this manner, pump rod 88 is driven in an oscillating manner draw fluid into displacement pump 18 and to drive the fluid downstream from displacement pump 18.

As stated above, load concentrating feature 96 is aligned with the centerline of pump rod 88. An area of load concentrating feature 96 is smaller than an area of head 94. To drive pump rod 88 into a downstroke a compressive force is applied to load concentrating feature 96. The reduced area of load concentrating feature 96 prevents the compressive force from being applied to the periphery of head 94, as applying the compressive force to the periphery of head 94 may cause side loading on pump rod 88. To prevent side loading, load concentrating feature 96 aligns the load along the centerline of displacement pump 18. Aligning the load and reducing side loading on pump rod 88 reduces the buildup of heat, friction, and wear on throat packings 144, piston packings 146, and other sealing and aligning surfaces of displacement pump 18. In this way, load concentrating feature 96 reduces side loading and increases the efficiency and lifespan of displacement pump 18.

Figure 6A:
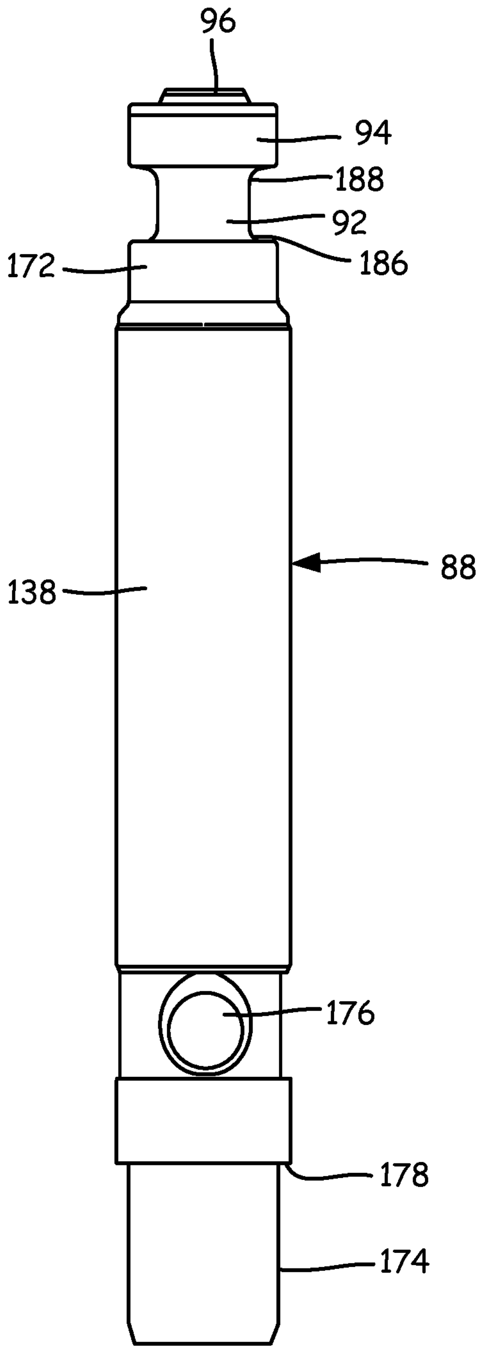
FIG. 6A is a front elevation view of a pump rod.
Figure 6B:
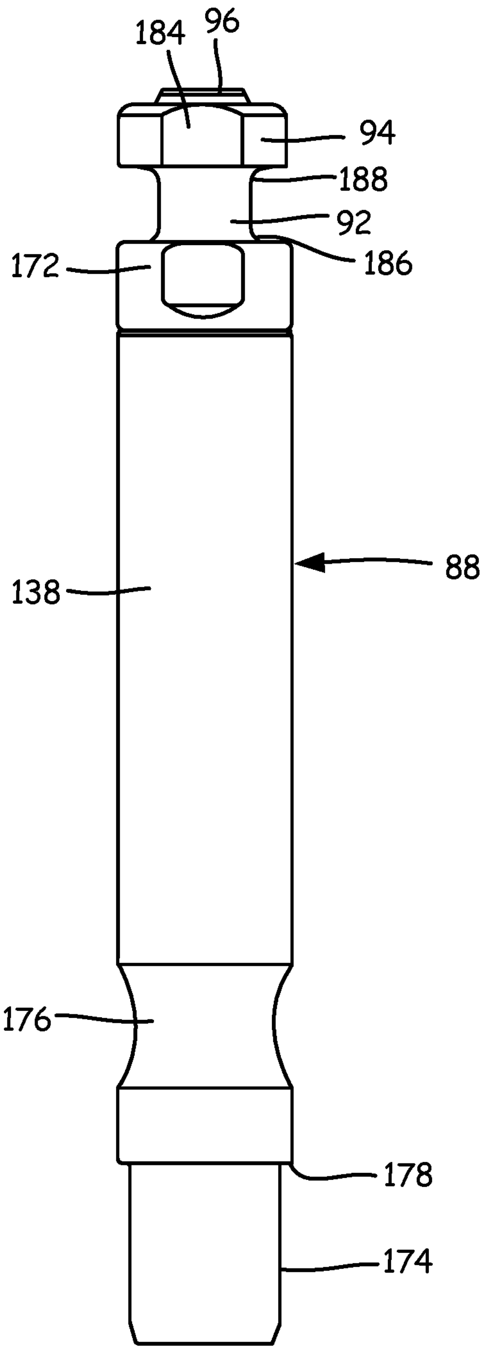
FIG. 6B is a side elevation view of a pump rod.

FIG. 6A is a front elevation view of pump rod 88. FIG. 6B is a side elevation view of pump rod 88. FIGS. 6A and 6B will be discussed together. Pump rod 88 includes first end 172, second end 174, shaft 138, neck 92, head 94, load concentrating feature 96, fluid passage 176, and shoulder 178. A periphery of head 94 includes anti-rotation feature 184. First fillet 186 is disposed at the connection of neck 92 and shaft 138, and second fillet 188 is disposed at the connection of neck 92 and head 94.

A periphery of head includes anti-rotation feature 184. Anti-rotation feature 184 is shown as opposing flat surfaces, which engage with sides of a drive cavity, such as drive cavity 106 (best seen in FIG. 7), to prevent pump rod 88 from rotating as pump rod 88 is driven during operation. Load concentrating feature 96 extends from a top of head 94, and load concentrating feature 96 may be aligned with the centerline of pump rod 88. An area of load concentrating feature 96 is smaller than an area of head 94. Neck 92 is attached to and extends from first end 172, and neck 92 extends between and connects shaft 138 and head 94. Referring specifically to FIG. 6A, fluid passage 176 extends into second end 174. Second end 174 is preferably hollow below fluid passage 176 such that a fluid may flow through second end 174 and to fluid passage 176. Fluid passage 176 allows the fluid to exit shaft 138 and to continue downstream.

During operation, load concentrating feature 96 receives a compressive force from a driving surface when pump rod 88 is driven into a downstroke. As load concentrating feature 96 projects from head 94, load concentrating feature 96 prevents a periphery of head 94 from being in contact with the driving surface. The smaller area of load concentrating feature 96 as compared to the area of head 94 and load concentrating feature reduces the misalignment between the driving force and the centerline of piston rod 88, thereby reducing heat, friction, and wear from accumulating on the aligning and sealing surfaces contacting pump rod 88. In this way, load concentrating feature 96 increases the useful life of pump rod 88 and of the aligning and sealing surfaces within a displacement pump utilizing pump rod 88. Load concentrating feature 96 is preferably a circular projection extending from head 94. It is understood, however, that load concentrating feature 96 may be a conical point, a hemispherical projection, a box-shaped projection, or of any other shape suitable for concentrating the driving forces closely coincident with the centerline.

Figure 7:
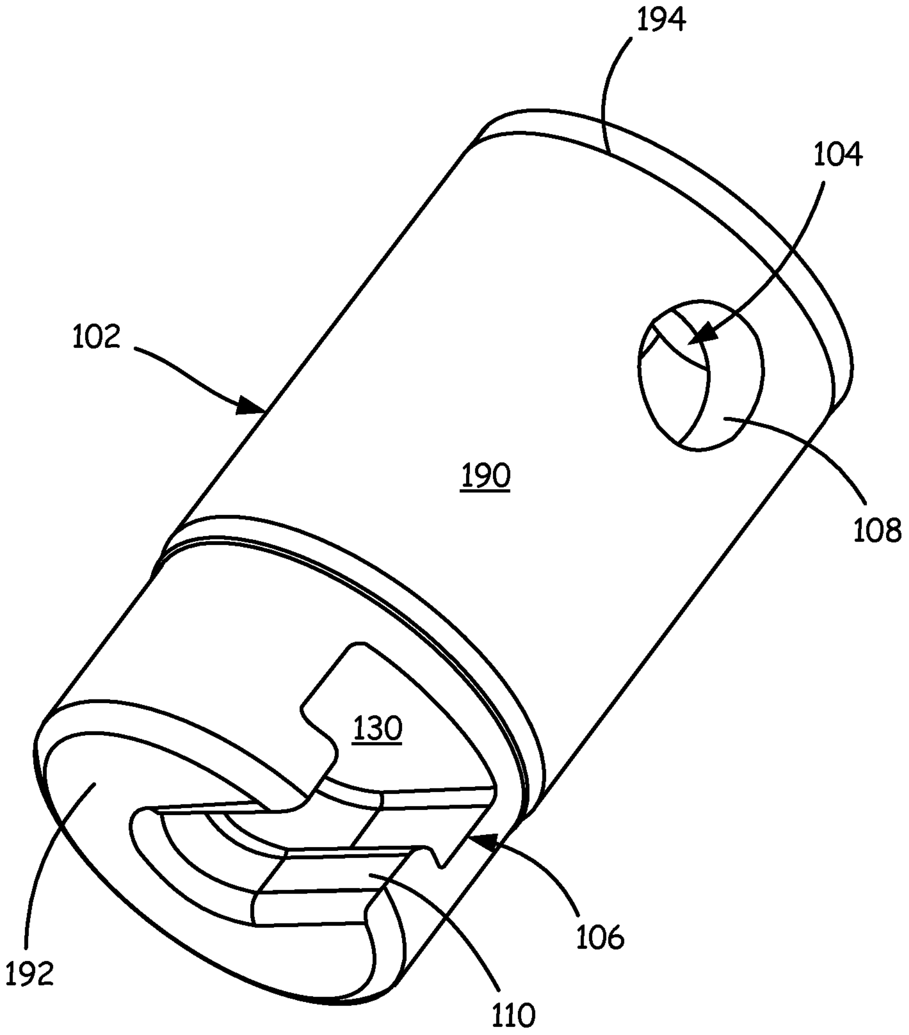
FIG. 7 is an isometric view of a reciprocating drive.

FIG. 7 is an isometric view of drive link 102. Drive link 102 includes body 190, first end 192, second end 194, connecting slot 104, drive cavity 106, second U-shaped flange 110, contact surface 130, and wrist pin hole 108.

Drive cavity 106 extends into first end 192 of drive link 102 and includes a forward-facing opening and a lower opening. Second U-shaped flange 110 extends from proximate a lower edge of drive cavity 106 and extends into drive cavity 106. Connecting slot 104 extends into second end 194 of body 190, and wrist pin hole 108 projects through second end 194 and connecting slot 104. Connecting slot 104 is configured to receive a connecting rod, such as connecting rod 100 (shown in FIG. 2), and wrist pin hole 108 is configured to receive a fastener, such as a wrist pin, to form a pinned connection between drive link 102 and the connecting rod. Connecting slot 104 is an elongated slot configured to allow the connecting rod to oscillate while driving drive link 102 in a reciprocating manner.

Drive cavity 106 is configured to receive a head, such as head 94 (shown in FIG. 6A), of a pump rod. Contact surface 130 abuts a top surface of the head of the pump rod and exerts a compressive force on the surface to drive the pump rod in a down stroke. With the head of the pump rod received within drive cavity 106, second U-shaped flange 110 surrounds a portion of the pump rod disposed below the head and having an area smaller than an area of the head, such as neck 92 (best seen in FIG. 6A). When drive link 102 pulls the pump rod into an upstroke, second U-shaped flange 110 engages a lower surface of the head and pulls the pump rod up.

While contact surface 130 is shown as a flat surface for contacting the pump rod, contact surface 130 may include a load concentrating feature, similar to load concentrating feature 96 (best seen in FIG. 6A), projecting from contact surface 130 and into drive cavity 106. For example, contact surface 130 may include a projection configured to abut the head of the pump rod, the projection may be circular, conical, hemispherical, cubic, or any other suitable shape for concentrating compressive force coincident with a centerline of the pump rod. Including a load concentrating feature on contact surface 130 allows drive link 102 to drive pump rods lacking a load concentrating feature, while also reducing axial misalignment between the pump rod and drive link 102, thereby increasing the life of various components of the displacement pump.

Figure 8A:
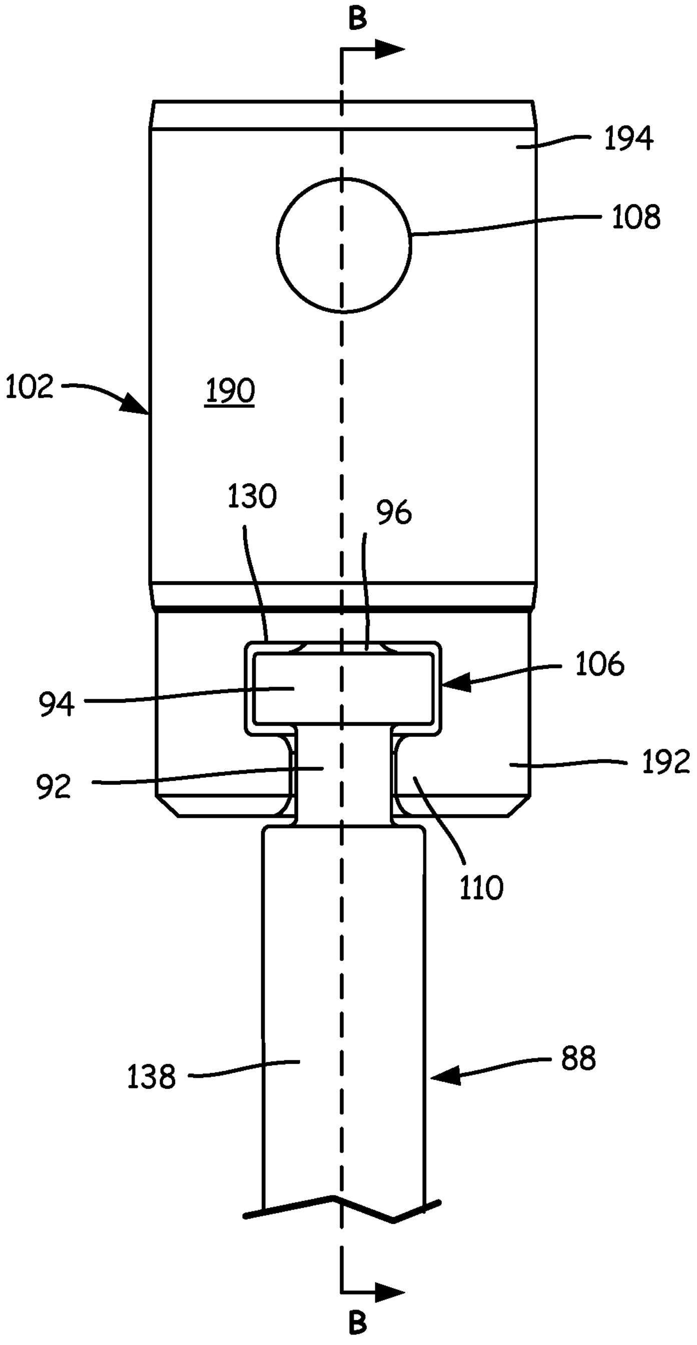
FIG. 8A is a front elevation view of a pump rod and a reciprocating drive.
Figure 8B:
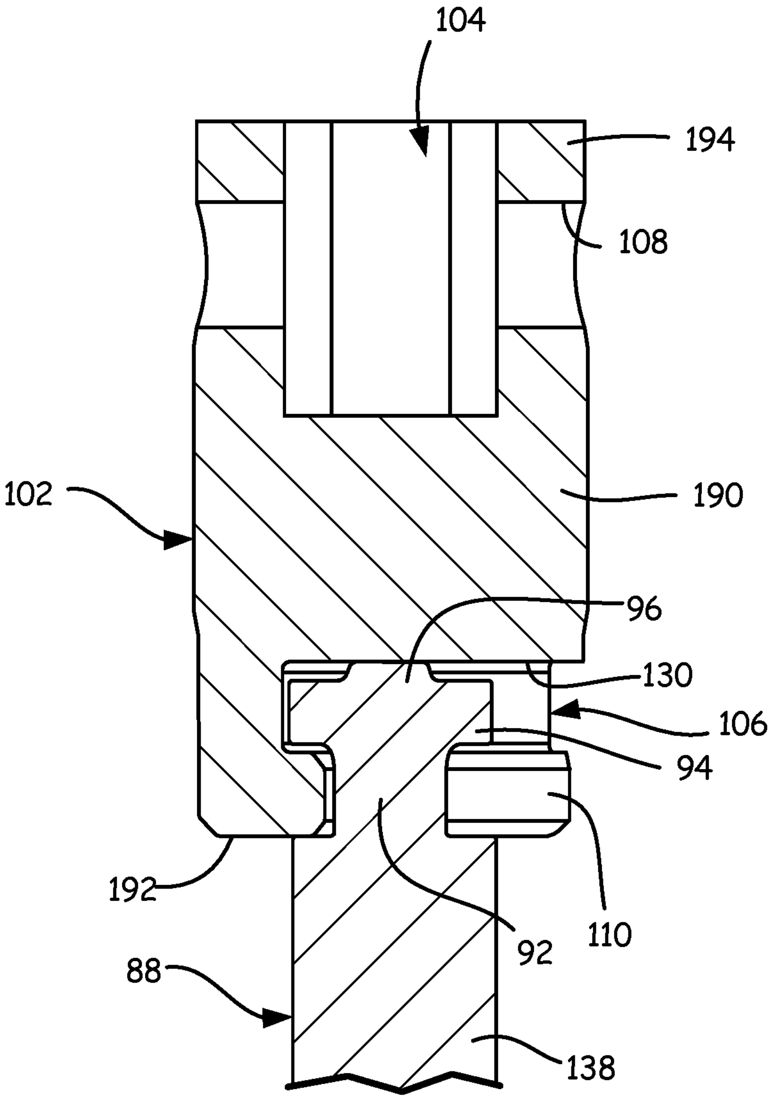
FIG. 8B is a cross-sectional view of the pump rod and the reciprocating drive of FIG. 8A taken along line B-B of FIG. 8A.

FIG. 8A is a front elevation view of pump rod 88 and drive link 102. FIG. 8B is a cross-sectional view of pump rod 88 and drive link 102 of FIG. 8A taken along line B-B of FIG. 8A. FIGS. 8A and 8B will be discussed together. Pump rod 88 includes shaft 138, neck 92, head 94, and load concentrating feature 96. Drive link 102 includes body 190, first end 192, second end 194, connecting slot 104, drive cavity 106, second U-shaped flange 110, contact surface 130, and wrist pin hole 108.

Neck 92 is connected to and extends from shaft 138. Head 94 is connected to neck 92, and neck 92 extends between and connects head 94 and shaft 138. The interconnection between neck 92 and shaft 138 includes first fillet 186 and the interconnection between neck 92 and head 94 includes second fillet 188. Load concentrating feature 96 projects from a top surface of head 94. A width of neck 92 is smaller than a width of head 94. An area of load concentrating feature 96 is similarly smaller than an area of head 94.

Drive cavity 106 extends into first end 192 of drive link 102 and includes a forward-facing opening and a lower opening. Second U-shaped flange 110 extends proximate a lower edge of drive cavity 106 and into drive cavity 106. As shown in FIG. 8B, connecting slot 104 extends into second end 194 of body 190, and wrist pin hole 108 projects through second end 194 and connecting slot 104. Connecting slot 104 is configured to receive a connecting rod, such as connecting rod 100 (shown in FIG. 2), and wrist pin hole 108 is configured to receive a fastener to form a pinned connection between drive link 102 and the connecting rod. The pinned connection allows the connecting rod to oscillate relative to drive link 102, such that the connecting rod may translate rotational motion to reciprocating motion to drive drive link 102 in a reciprocating manner.

During mounting, head 94 is inserted into drive cavity 106 through the forward-facing opening, and neck 92 extends through the lower opening. Second U-shaped flange 110 is disposed around neck 92 and abuts a lower surface of head 94. Load concentrating feature 96 abuts contact surface 130 of drive cavity 106. Load concentrating feature 96 abutting contact surface 130 prevents head 94 from being in contact with contact surface 130. Preventing the periphery of head 94 from contacting contact surface 130 reduces misalignment between pump rod 88 and drive link 102, thereby preventing excessive side loads from being transmitted to pump rod 88.

During an upstroke drive link 102 pulls pump rod 88 in an upward direction. To pull pump rod 88 upward, second U-shaped flange 110 engages a bottom surface of head 94. After pump rod 88 has completed an upstroke, drive link 102 reverses direction and pushes pump rod 88 into a downstroke.

When pump rod 88 is driven into a downstroke, contact surface 130 exerts a compressive force on load concentrating feature 96 such that drive link 102 pushes pump rod 88 in a downward direction. As load concentrating feature 96 has a smaller area than head 94, the force is concentrated by load concentrating feature 96 to minimize a distance from an edge of load concentrating feature 96 to a center of drive link 102, where the force is applied. Minimizing the misalignment of the compressive forces prevents side loading on pump rod 88, which increases the life of pump rod 88 and of the various sealing and aligning components that contact pump rod 88 during operation. While load concentrating feature 96 is illustrated as a circular projection extending from head 94, load concentrating feature 96 may be a conical point, a hemispherical projection, a box-shaped projection, or of any other shape suitable for concentrating the driving forces closely coincident. It is further understood that load concentrating feature 96 may be aligned with the centerline of pump rod 88 or may be offset from the centerline of pump rod 88. While load concentrating feature 96 is illustrated as a single projection, load concentrating feature 96 may include multiple load concentrating features projecting from pump rod 88. Additionally, it is understood that a load concentrating feature may extend from contact surface 130, in addition to or in lieu of load concentrating feature 96. The drive link load concentrating feature may contact head 94 directly or may contact a matching load concentrating feature 96 disposed on head 94. Similar to load concentrating feature 96, a load concentrating feature extending from contact surface is configured to minimize misalignment of driving forces experienced by pump rod 88 and to thereby reduce any side load experienced by pump rod 88. In addition, the drive link load concentrating feature may take any suitable shape for concentrating the driving forces coincident with the centerline of the drive link 96 and pump rod 88, such as a cylindrical projection, hemispherical projection, or any other suitable shape.

Figure 9A:
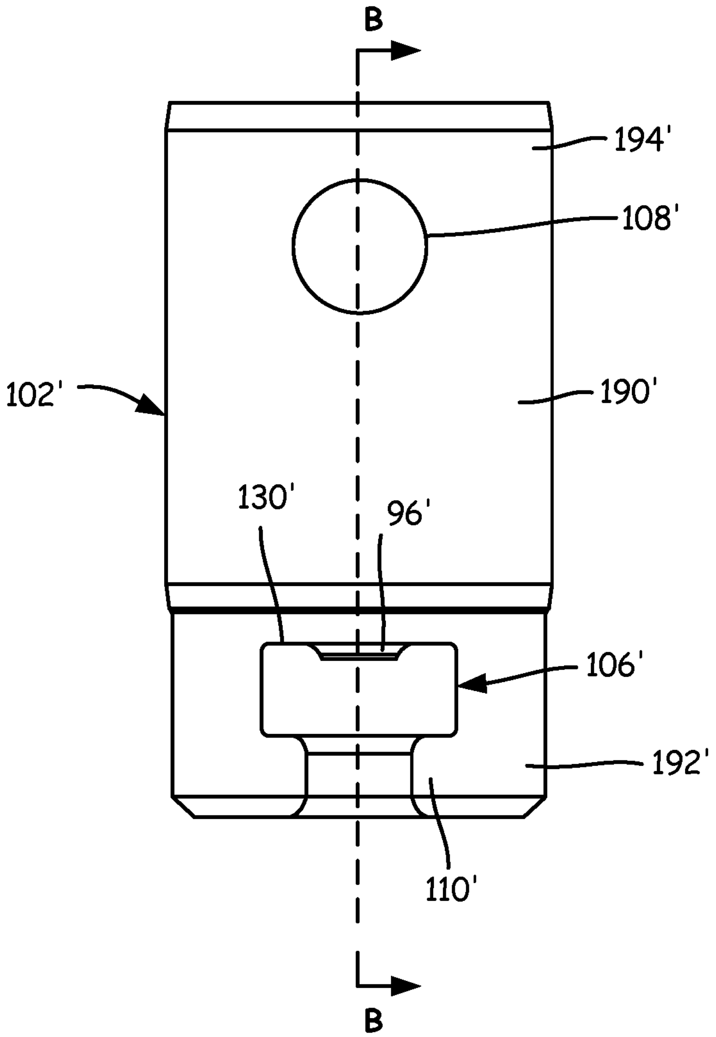
FIG. 9A is a front elevation view of a drive link.
Figure 9B:
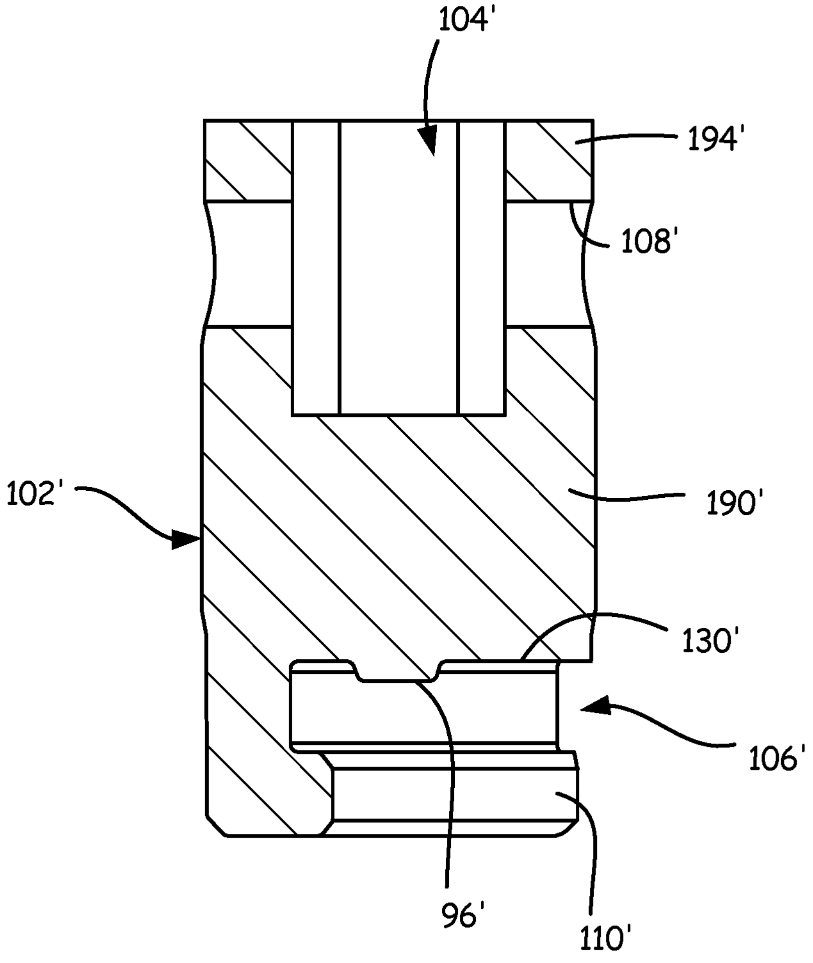
FIG. 9B is a cross-sectional view of the drive link of FIG. 9A taken along line B-B of FIG. 9A.

FIG. 9A is front elevation view of drive link 102'. FIG. 9B is a cross-sectional view of drive link 102' taken along line B-B is FIG. 9B. Drive link 102' includes body 190', first end 192', second end 194', connecting slot 104', drive cavity 106', wrist pin hole 108', second U-shaped flange 110', contact surface 130', and load concentrating feature 96'.

Drive cavity 106' extends into first end 192' of drive link 102' and includes a forward-facing opening and a lower opening. Second U-shaped flange 110' extends from proximate a lower edge of drive cavity 106' and extends into drive cavity 106'. Connecting slot 104' extends into second end 194' of body 190', and wrist pin hole 108' projects through second end 194' and connecting slot 104'. Connecting slot 104' is configured to receive a connecting rod, such as connecting rod 100 (shown in FIG. 2A), and wrist pin hole 108' is configured to receive a fastener, such as a wrist pin, to form a pinned connection between drive link 102' and the connecting rod.

Drive cavity 106' is configured to receive a portion of a pump rod, as head 94 (shown in FIG. 6A), of a pump rod. Load concentrating feature 96' abuts a top surface of the head of the pump rod and exerts a compressive force on the top surface of the head. Load concentrating feature 96' is a cylindrical projection. Load concentrating feature 96' contacts the top surface of the head and transmits a compressive force to the head to drive the pump rod into a downstroke. Load concentrating feature 96' projecting from contact surface 130' prevents contact surface 130' from contacting the head while drive link 102' is driving the pump rod.

An area of load concentrating feature 96' is smaller than an area of the top of the head. The smaller area of load concentrating feature 96' prevents loads from being experienced on the periphery of the head. In addition, the smaller area of load concentrating feature 96' concentrates the loads transmitted from load concentrating feature 96' more closely coincident with a centerline of the pump rod. Concentrating the loads minimizes any misalignment of the forces between drive link 102' and the pump rod. Minimizing the misalignment of the forces reduces any side loads transmitted to the head, thereby reducing the buildup of harmful heat, friction, and wear on the sealing and aligning surfaces within a displacement pump. Preventing the buildup of stresses increases the useful life of the aligning and sealing surfaces, of the pump rod, and of the displacement pump. While load concentrating feature 96' is illustrated as a single projection, it is understood that load concentrating feature 96' may include a plurality of projections extending from contact surface 130' and configured to transmit compressive forces to the pump rod.

During operation, the head of the pump rod received within drive cavity 106' and second U-shaped flange 110' surrounds a portion of the pump rod disposed below the head and having an area smaller than an area of the head, such as neck 92 (best seen in FIG. 6A). When drive link 102' pulls the pump rod into an upstroke, second U-shaped flange 110' engages a lower surface of the head and pulls the pump rod into an upstroke.

As load concentrating feature 96' is configured to directly contact the head of the pump rod, load concentrating feature 96' concentrates the load more closely coincident with a centerline of the pump rod and prevents driving forces from being experienced at a periphery of the head. Load concentrating feature 96' allows drive link 102' to drive pump rods that lack a load concentrating feature, such as load concentrating feature 96 (shown in FIGS. 2A-6B, 8A, 8B), while preventing misalignment of the compressive forces. While load concentrating feature 96' is illustrated as a cylindrical projection extending axially from contact surface 130', load concentrating feature 96' may be, conical, hemispherical, cubic, or any other suitable shape for concentrating compressive force coincident with a centerline of the pump rod. Load concentrating feature 96' reduces side loading, prevents misalignment, and concentrates driving loads, thereby increasing the useful life of various components within the displacement pump.

Figure 10A:
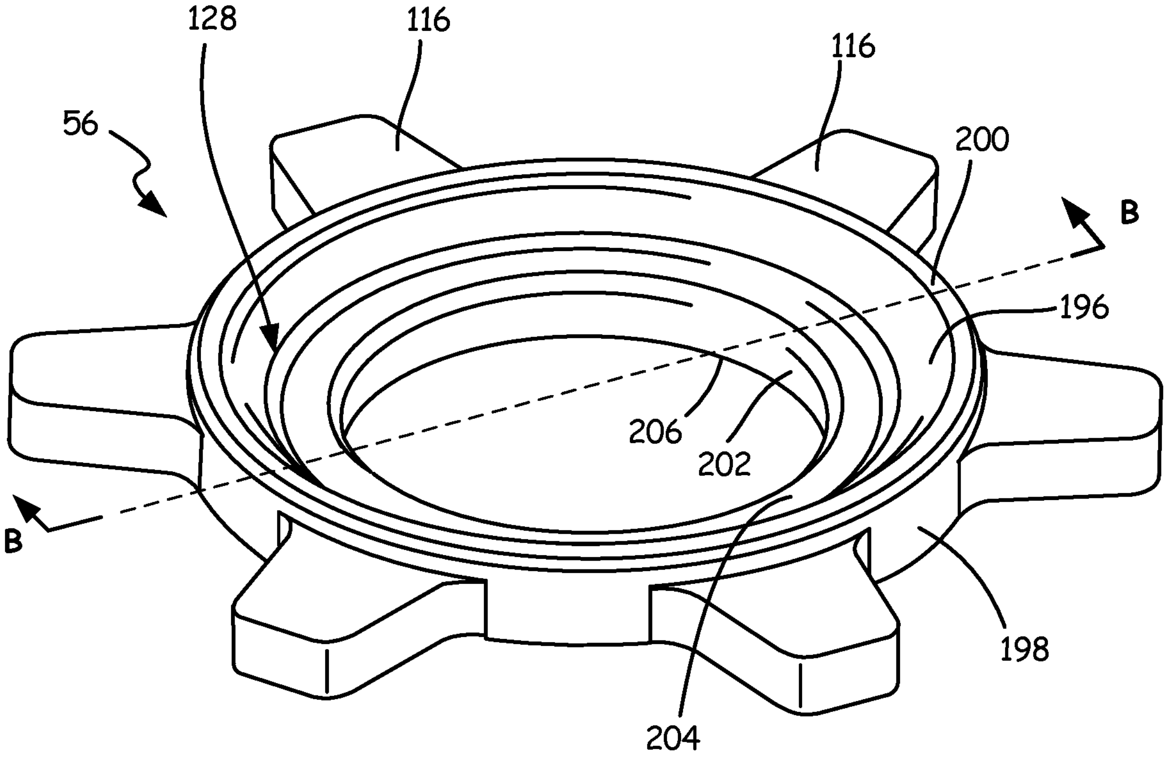
FIG. 10A is an isometric view of a tightening ring.
Figure 10B:
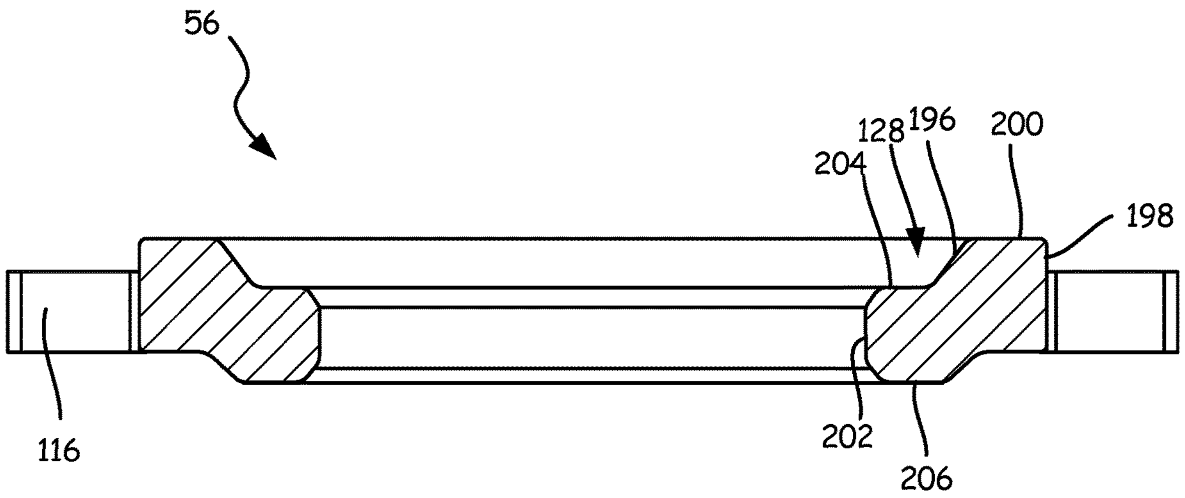
FIG. 10B is a cross-sectional view of the tightening ring of FIG. 10A taken along line B-B of FIG. 10A.

FIG. 10A is an isometric view of tightening ring 56. FIG. 10B is a cross-sectional view of tightening ring 56 taken along line B-B in FIG. 10A. FIGS. 10A and 10B will be discussed together. Tightening ring 56 includes aligning cone 128, projections 116, first inner wall 196, outer wall 198, first top edge 200, second inner wall 202, second top edge 204, and bottom edge 206.

Projections 116 are attached to and extend from outer wall 198. Projections 116 allow a user to easily manipulate tightening ring 56. First inner wall 196 and second top edge 204 form aligning cone 128. First inner wall 196 is preferably a sloped wall and first inner wall 196 extends between first top edge 200 and second top edge 204. Second inner wall 202 preferably includes internal threading configured to engage external threading on a displacement pump, such as displacement pump 18. The internal threading on second inner wall 202 allows tightening ring 56 to rotate about the displacement pump such that tightening ring 56 may be loosened to allow a user to remove the displacement pump or tightened as part of a clamp, such as clamp 20 (best seen in FIG. 2), to secure the displacement pump in place. While tightening ring 56 is described as including a plurality of projections, it is understood that tightening ring 56 may include other configurations to allow a user to manipulate tightening ring 56, such as depressions, like slots or holes, or having a different shape, such as a hex or square.

Aligning cone 128 is configured to receive a protrusion, such as protrusion 82 (shown in FIGS. 2 and 3), extending from a drive housing. Aligning cone 128 receives the protrusion and the protrusion abuts first inner wall 196 and second top edge 204. Receiving protrusion within aligning cone 128 properly aligns the displacement pump when the displacement pump is installed. Ensuring that the displacement pump is properly aligned with a driving mechanism that drives the displacement pump increases the life of the displacement pump and prevents the displacement pump from experiencing unnecessary wear. In addition, tightening ring 56 allows a user to easily secure or unsecure a displacement pump by using projections 116 to rotate tightening ring 56 about the displacement pump. The user may thus uninstall the displacement pump by merely rotating tightening ring 56, thereby decreasing the downtime required to replace a displacement pump. Moreover, aligning cone 128 provides structural integrity to the drive housing. Aligning cone 128 receives the protrusion extending from the drive housing, and the protrusion is fully enclosed within aligning cone 128. Fully enclosing the projection secures the drive housing together and prevents the drive housing from being driven apart by forces experienced during operation.

Figure 11A:
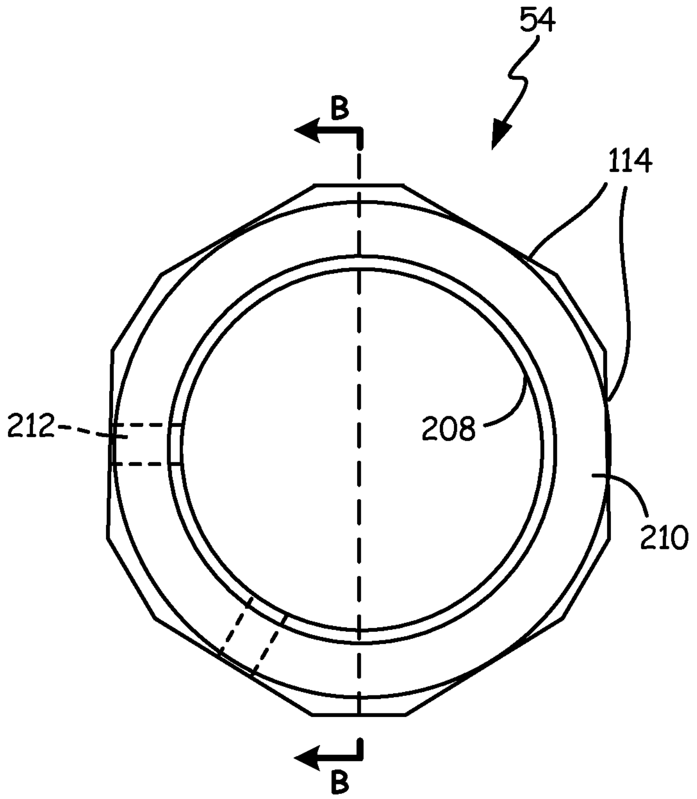
FIG. 11A is a top elevation view of an axial ring.
Figure 11B:
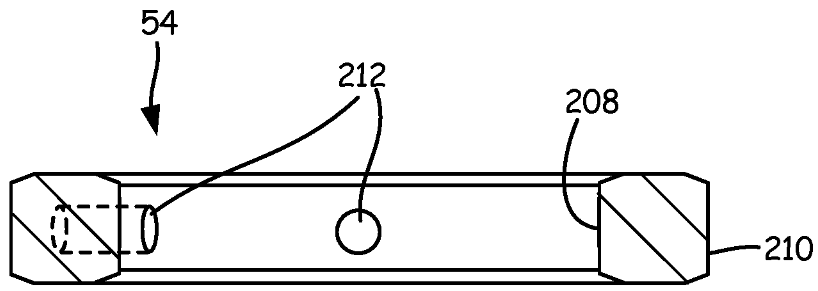
FIG. 11B is a cross-sectional view of the axial ring of FIG. 11A taken along line B-B of FIG. 11A.

FIG. 11A is a top view of axial ring 54. FIG. 11B is a cross-sectional view of axial ring 54 taken along line B-B of FIG. 11A. FIGS. 11A and 11B will be discussed together. Axial ring 54 includes alignment features 114, through holes 176, inner edge 208, and outer edge 210. Through holes 176 extend through axial ring 54 between outer edge 210 and inner edge 208. Alignment features 114 are disposed about a periphery of outer edge 210. Inner edge 208 of axial ring 54 may include internal threading configured to engage an external threading extending about a displacement pump, such as threaded portion 212 of threaded pump 18' (shown in FIG. 12).

Axial ring 54 is configured to be fixed to a displacement pump and to function as part of a clamp to secure the displacement pump to a drive housing. Alignment features 114 are configured to abut the internal walls of a mounting cavity, such as mounting cavity 36 (best seen in FIG. 2). Alignment features 114 are illustrated as flat walls, which both prevent rotation of the displacement pump during operation and align the displacement pump when axial ring 54 is slid into the mounting cavity.

Fasteners, such as set screws, extend through through-holes 176 to engage an outer surface of the displacement pump and to fix axial ring 54 to the displacement pump. The fasteners secure axial ring 54 at a desired position on the displacement pump. Axial ring 54 is secured at a location on the displacement pump that ensures a pump rod has a desired stroke length. Fixing axial ring 54 too low on a displacement pump allows the pump rod to be driven such that the pump rod will bottom-out within the displacement pump. Having the pump rod bottom out would damage the displacement pump, the pump rod, and the seals within the displacement pump. Conversely, fixing axial ring 54 too high on the displacement pump would result in a reduced stroke length of the pump rod. Having too short of a stoke length reduces the downstream pressure that the displacement pump is capable of providing, thereby reducing the efficiency of the displacement pump. In addition, axial ring 54 is configured to easily slide into and out of the drive housing, thereby minimizing downtime required to install a new displacement pump and reducing the complexity of installation.

Figure 12:
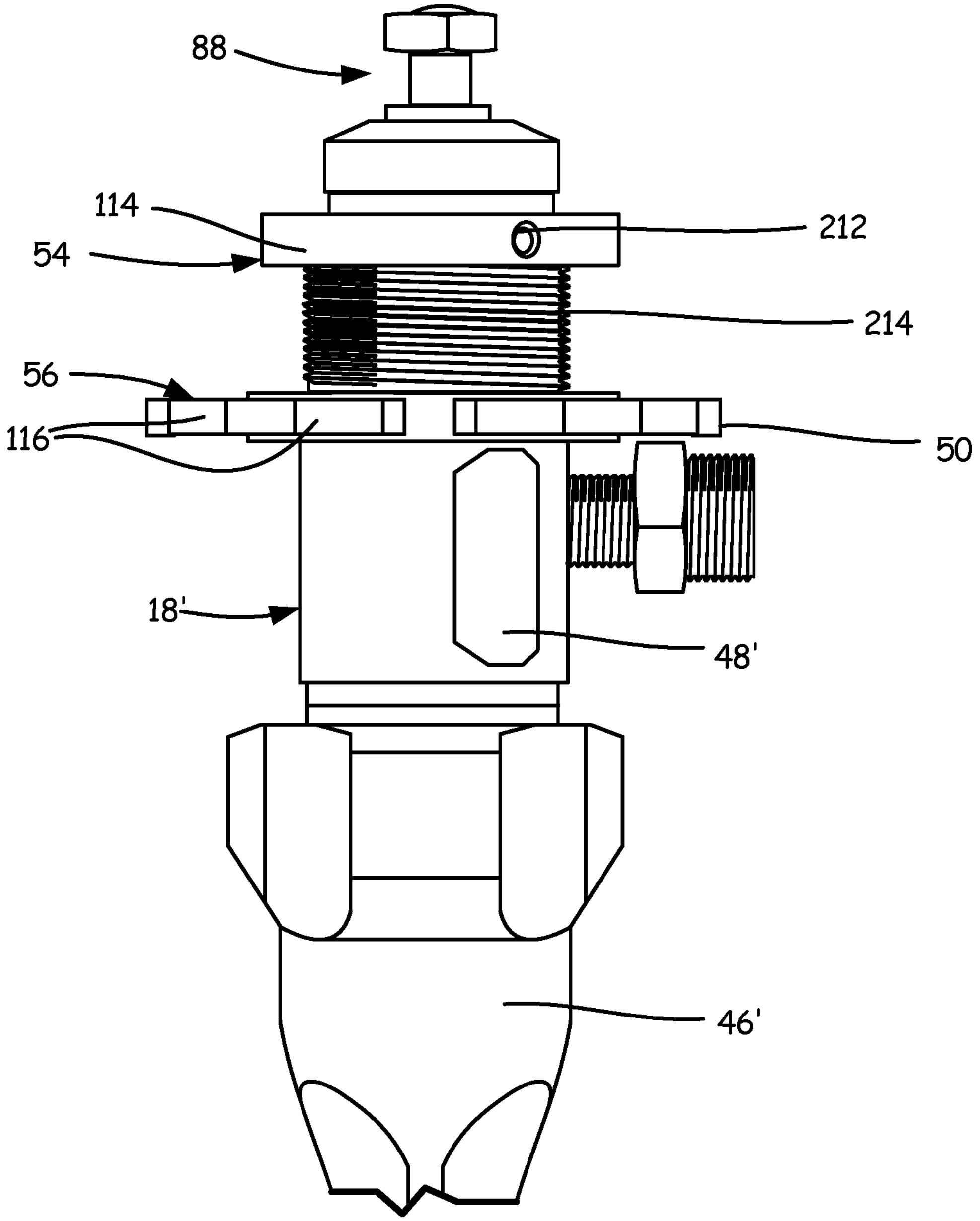
FIG. 12 is an elevation view of a threaded pump with an axial ring and a tightening ring.

Clamp 20 may be utilized to convert a thread-mounted pump from a thread-mounting configuration to an axial-mounting configuration. FIG. 12 is an elevation view of threaded pump 18' with clamp 20 mounted to threaded pump 18'. Clamp 20 includes axial ring 54 and tightening ring 56. Threaded pump 18' includes intake valve 46', pump cylinder 48', and pump rod 88. Pump cylinder 48' includes threaded portion 212 and fluid outlet 50'. Axial ring 54 includes through-hole 214 and alignment features 114. Tightening ring 56 includes projections 116. Gap 98 is disposed between and defined by axial ring 54 and tightening ring 56.

Pump cylinder 48' is attached to intake valve 46', and pump rod 88' extends out of pump cylinder 48'. Threaded portion 212 at an end of pump cylinder 48' opposite an end attached to intake valve 46'. Tightening ring 56 is threaded onto threaded portion 212. A user may grip projections 116 to rotate tightening ring 56 about threaded portion 212. Axial ring 54 is similarly threaded onto threaded portion 212 above tightening ring 56. However, unlike tightening ring 56 which remains free to rotate about threaded portion 212, axial ring 54 is fixed to at a preferred position on threaded portion 212. A fastener, such as a set screw, extends through through-hole 214 and engages threaded portion 212 to secure axial ring 54 to threaded portion 212. Gap 98 is disposed between and defined by axial ring 54 and tightening ring 56. Tightening ring 56 may be rotated about threaded portion 176 to either increase or decrease the size of gap 98. In this way, gap 98 may receive a projection from a drive housing, such as first U-shaped flange (best seen in FIG. 3), and tightening ring 56 may be rotated to close gap 98 such that axial ring 54 and tightening ring 56 exert a clamping force on the projection.

Typically a threaded pump, such as threaded pump 18', is secured to a fluid dispensing system, such as fluid dispensing system 10 (shown in FIG. 1), by screwing threaded portion 212 into a similarly threaded opening in the drive housing. The pump rod is then pinned to a drive mechanism within the drive housing. As such, threaded pump 18' relies on threaded portion 176 engaging corresponding threading within the drive housing for alignment and to ensure concentricity of threaded pump 18' and the drive mechanism.

Clamp 20 provides a conversion mechanism for converting threaded pumps, such as threaded pump 18', from thread mounting to axial clamp mounting. Tightening ring 56 includes internal threading configured to mate with threaded portion 212. Tightening ring 56 is threaded onto threaded portion 212. Similar to tightening ring 56, axial ring 54 includes internal threading configured to mate with the external threading of threaded portion 212, and axial ring is threaded onto threaded portion 212 above tightening ring 56. Axial ring 54 is fixed to threaded portion 212 at a predetermined location and secured in place by a fastener extending into through hole 214 and engaging threaded portion 212. With fastener securing axial ring 54 to threaded portion 212, through-hole 214 may be filled with a sealant, such as silicone, to secure the fastener within through-hole 214. Axial ring 54 is secured to threaded portion 212 at a location where axial ring 54 limits the stroke length of pump rod 88. For example, fixing axial ring 54 too low on pump cylinder 48' allows pump rod 88 to be driven such a distance that pump rod 88' will bottom-out within pump cylinder 48'. Pump rod 88' bottoming out would cause damage to pump cylinder 48', pump rod 88', and seals within threaded pump 18'. Conversely, fixing axial ring 54 too high on pump cylinder 48' would result in a reduced stroke length for pump rod 88'. Having too short of a stoke length reduces the downstream pressure that threaded pump 18' is capable of providing and reduces the efficiency of threaded pump 18'. Therefore, axial ring 54 is fixed on threaded portion 212 of pump cylinder 48' such that pump rod 88' is driven a desired stroke length.

Axial ring 54 limits the stoke length of pump rod 88', and alignment features 114 are configured to engage the edges of a slot in the drive housing within which axial ring 54 is disposed. Alignment features 114 properly align fluid outlet 50' and prevent rotation of threaded pump 18' during operation. When installed, tightening ring 56 is rotated about threaded portion 212 such that gap 98 is decreased and axial ring 54 and tightening ring 56 exert a clamping force on the drive housing. Axial ring 54 and tightening ring 56 clamping on the drive housing aligns threaded pump 18' and ensures concentricity of threaded pump 18', pump rod 88', and the driving member. In this way, clamp 20 facilitates the conversion of threaded pump 18' for use with axial clamping, and allows threaded pumps to be used in both their original mounting configuration and in axial-clamping systems. Converting threaded pump 18' for use in axial clamping reduces the complexity of the system and increases efficiency. With clamp 20, threaded pump 18' is slid into a drive housing and mounted by simply rotating tightening ring 56, instead of having to fully thread threaded pump 18' into the drive housing.

Although the present invention has been described with reference to preferred embodiments, workers skilled in the art will recognize that changes may be made in form and detail without departing from the spirit and scope of the invention.

The invention claimed is:

1. A pump mounting system comprising:
- a drive housing including a mounting slot with a forward facing opening through a front of the drive housing, and a lower opening through a bottom of the drive housing, wherein a protrusion extends from the drive housing, the protrusion disposed at least partially around the lower opening; and
- a driving link disposed within the drive housing, the driving link comprising a drive cavity;
- a pump that reciprocates, the pump comprising:
  - a pump cylinder;
  - a pump rod partially disposed in the pump cylinder, the pump rod configured to reciprocate along an axis to pump fluid, and the pump rod comprising:
    - a neck formed at an end of the pump rod disposed outside of the cylinder, the neck having a neck width; and
    - a head connected to the neck, the head located above the neck, the head having a head width that is larger than the neck width of the neck; and
  - a clamp configured to secure the pump to the drive housing, the clamp comprising:
    - a first ring projecting from the pump cylinder and configured to support the pump on the drive housing; and
    - a tightening ring disposed about the pump cylinder and configured to shift axially relative to the axis to secure and release the pump from the drive housing, wherein the tightening ring receives the protrusion with the pump secured to the drive housing to align the pump rod with the driving link.

2. The system of claim 1, wherein the protrusion extends downwards from the drive housing.

3. The system of claim 1, wherein the protrusion includes a sloped outer wall and the tightening ring includes a sloped inner wall configured to interface with the sloped outer wall.

4. The system of claim 1, wherein the tightening ring includes a plurality of projections extending radially outward relative to the axis.

5. The system of claim 1, further comprising:
- a guard movable between an open state and a closed state in which the guard is disposed over the forward-facing opening to prevent sliding of the pump out of the mounting slot;
- wherein the tightening ring receives a portion of the guard with the guard in the closed state such that the tightening ring retains the guard in the closed state.

6. The system of claim 5, wherein the guard includes a second protrusion that is received by the tightening ring.

7. The system of claim 6, wherein the protrusion and the second protrusion form a ring about the lower opening with the guard in the closed state.

8. The system of claim 1, wherein the tightening ring is threadedly connected to the pump.

9. The system of claim 1, wherein a projection extends from an end of the head opposite the neck, the projection aligned on the axis and the projection configured to directly interface with the driving link.

10. The system of claim 1, further comprising:
- a fluid dispensing hose connected to the pump to receive fluid output by the pump, the fluid dispensing hose located outside of the drive housing.

11. The system of claim 1, wherein the drive housing comprises a flange that extends around the lower opening, the flange received within a gap between the first ring and the tightening ring when the pump is mounted on the drive housing.

12. The system of claim 11, wherein the protrusion extends from the flange.

13. The system of claim 11, wherein the flange is a U-shaped flange open at the forward facing opening.

14. The system of claim 1, wherein the pump is configured to be inserted through the forward facing opening by a push motion such that the drive housing is received within a gap between the first ring and the tightening ring and such that the head slides into the drive cavity.

15. The system of claim 14, wherein the pump is configured to be removed through the forward facing opening by a pull motion such that the drive housing moves out from within the gap between the first ring and the tightening ring and such that the head slides out of the drive cavity.

16. The system of claim 1, further comprising a frame which supports the drive housing, the frame comprising a plurality of legs.

17. The system of claim 1, wherein:
- the pump rod includes a raised surface projecting from the head, the raised surface configured to interface with the driving link.

18. The system of claim 17, wherein the raised surface is inset from a periphery of the head.

19. The system of claim 1, wherein the tightening ring is located lower along the pump cylinder than the first ring such that the tightening ring is disposed outside of the drive housing while the first ring is disposed within the mounting slot with the pump mounted to the drive housing.

20. The system of claim 1, wherein the tightening ring includes an aligning cone configured to receive the protrusion, the aligning cone formed by a sloped inner wall and a top edge oriented axially towards the drive housing.

* * * * *